US009981552B2

(12) United States Patent
Ogawa et al.

(10) Patent No.: US 9,981,552 B2
(45) Date of Patent: May 29, 2018

(54) CLUTCH CONTROL DEVICE FOR FOUR-WHEEL DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 50 days.

(21) Appl. No.: 15/118,259

(22) PCT Filed: Feb. 24, 2015

(86) PCT No.: PCT/JP2015/055248
§ 371 (c)(1),
(2) Date: Aug. 11, 2016

(87) PCT Pub. No.: WO2015/129693
PCT Pub. Date: Sep. 3, 2015

(65) Prior Publication Data
US 2017/0182887 A1    Jun. 29, 2017

(30) Foreign Application Priority Data

Feb. 28, 2014  (JP) .................................. 2014-038482
Feb. 28, 2014  (JP) .................................. 2014-038483

(51) Int. Cl.
*B60K 23/08*   (2006.01)
*F16D 48/06*   (2006.01)
(Continued)

(52) U.S. Cl.
CPC .............. *B60K 23/08* (2013.01); *B60K 17/02* (2013.01); *B60K 17/344* (2013.01); *F16D 11/00* (2013.01);
(Continued)

(58) Field of Classification Search
None
See application file for complete search history.

(56) References Cited

U.S. PATENT DOCUMENTS 5,699,871 A * 12/1997 Hara .................... B60K 17/348
                                                    180/247
2010/0044183 A1  2/2010  Guggolz et al.
(Continued)

FOREIGN PATENT DOCUMENTS

JP    2009-275760 A    11/2009
JP    2010-254058 A    11/2010

*Primary Examiner* — Jacob S. Scott
*Assistant Examiner* — Timothy Hannon
(74) *Attorney, Agent, or Firm* — Global IP Counselors, LLP

(57) ABSTRACT

A clutch control device is provided for a four-wheel drive vehicle for transmitting drive force to the rear wheels. The clutch control device includes a dog clutch and a friction clutch, and a 4WD control unit that controls the engagement and disengagement of the dog clutch and the friction clutch. The 4WD control unit is switchable between a two-wheel drive mode and a four-wheel drive mode. The 4WD control unit is programmed to control engagement of the dog clutch so that the dog clutch is engaged after the friction clutch is engaged and the dog clutch is synchronized. During engagement of the dog clutch, the 4WD control unit is programmed to reduce a transmission torque of the friction clutch when the dog clutch engagement standby state is detected.

20 Claims, 12 Drawing Sheets

(51) Int. Cl.
  *B60K 17/02* (2006.01)
  *F16D 21/00* (2006.01)
  *B60K 17/344* (2006.01)
  *F16D 11/00* (2006.01)
  *F16D 13/00* (2006.01)

(52) U.S. Cl.
  CPC ............ *F16D 13/00* (2013.01); *F16D 21/00* (2013.01); *F16D 48/06* (2013.01); *B60K 2023/0825* (2013.01); *B60K 2023/0833* (2013.01); *B60K 2023/0858* (2013.01); *F16D 2500/1045* (2013.01); *F16D 2500/10431* (2013.01); *F16D 2500/10462* (2013.01); *F16D 2500/3108* (2013.01); *F16D 2500/3144* (2013.01); *F16D 2500/5122* (2013.01)

(56) References Cited

U.S. PATENT DOCUMENTS

| | | | |
|---|---|---|---|
| 2010/0094519 A1 | 4/2010 | Quehenberger et al. | |
| 2010/0274456 A1 | 10/2010 | Kondo et al. | |
| 2011/0087410 A1* | 4/2011 | Cimatti | B60K 17/35 701/60 |
| 2013/0226421 A1* | 8/2013 | Horaguchi | B60K 17/344 701/67 |

* cited by examiner

US 9,981,552 B2

CLUTCH CONTROL DEVICE FOR FOUR-WHEEL DRIVE VEHICLE

CROSS-REFERENCE TO RELATED APPLICATIONS

This application is a U.S. National stage application of International Application No. PCT/JP2015/055248, filed Feb. 24, 2015, which claims priority to JP Patent Application No. 2014-038482 filed on Feb. 28, 2014, and JP Patent Application No. 2014-038483 filed on Feb. 28, 2014, the contents of which are hereby incorporated herein by reference.

BACKGROUND

Field of the Invention

The present invention generally relates to a clutch control device for a four-wheel drive vehicle in which a system for transmitting drive force to auxiliary drive wheels is provided with a dog clutch and a friction clutch.

Background Information

Conventionally, a front wheel drive based four-wheel drive vehicle in which a system for transmitting drive force to the rear wheels is provided with a dog clutch and a friction clutch is known (refer to, for example, Japanese Laid-Open Patent Application No. 2010-254058). In this four-wheel drive vehicle, when switching from the two-wheel drive mode to the four-wheel drive mode, the dog clutch is engaged after the friction clutch is engaged and the drive source side and the rear wheel side of the dog clutch are synchronized. In addition, when switching from the four-wheel drive mode to the two-wheel drive mode, the dog clutch is released after the friction clutch is released.

SUMMARY

In the above-described prior art, when engaging the dog clutch, the dog clutch is engaged after the friction clutch is engaged and the drive source-side and the auxiliary drive wheel-side of the dog clutch are synchronized. However, when the dog clutch is synchronized, there are cases in which the teeth of the engagement member on the drive source side and the teeth of the engagement member on the auxiliary drive wheel-side strike each other, and synchronous rotation takes place in an engagement standby state in which an engagement is not made. In this case, the wait state is maintained until a differential rotation occurs between the main drive wheel-side and the auxiliary drive wheel-side of the dog clutch, and a switching of the drive mode cannot be completed. Therefore, if the dog clutch is maintained in an engagement standby state when attempting to switch the drive mode to a four-wheel drive mode in order to increase travel stability, there is also the risk that a switch to the four-wheel drive mode is not made, and that sufficient travel stability cannot be obtained during that time.

In view of the problem described above, an object of the present invention is to provide a clutch control device for a four-wheel drive vehicle that is capable of reliably carrying out an engagement of a dog clutch.

In order to achieve the object described above, the present invention is a clutch control device for a four-wheel drive vehicle, comprising a dog clutch and a friction clutch that are respectively arranged separately in a drive branch-side transmission system path and in an auxiliary drive wheel-side transmission system path which sandwich a differential, in a system for transmitting drive force to the auxiliary drive wheels, wherein when engaging the dog clutch, a clutch control unit that controls the engagement and disengagement of the two clutches engages the dog clutch after engaging the friction clutch and synchronizing the dog clutch and reduces the transmission torque of the friction clutch when an engagement standby state of the dog clutch is detected when engaging the dog clutch.

In the clutch control device for a four-wheel drive vehicle of the present invention, when engaging a dog clutch, the clutch control unit engages the dog clutch after engaging a friction clutch and synchronizing the dog clutch. Then, at the time of this engagement of the dog clutch, if an engagement standby state is detected in which the engagement is incomplete due to an impact of a meshing portion such as the teeth, the clutch control device reduces the transmission torque of the friction clutch. By reducing the transmission torque of the friction clutch, the distribution of drive force to the auxiliary drive wheels is reduced and a differential rotation is generated between the drive source side and the auxiliary drive wheel-side of the dog clutch; therefore, the meshing portions such as the teeth are moved relative to each other, allowing the engagement of the dog clutch to be completed. In this manner, in the present invention, even if the state becomes an engagement standby state when engaging the dog clutch, in which the engagement is incomplete due to an impact of a meshing portion, or the like, it is possible to generate a differential rotation in the dog clutch in order to reliably realize an engagement.

DETAILED DESCRIPTION OF THE EMBODIMENTS

Figure 1:
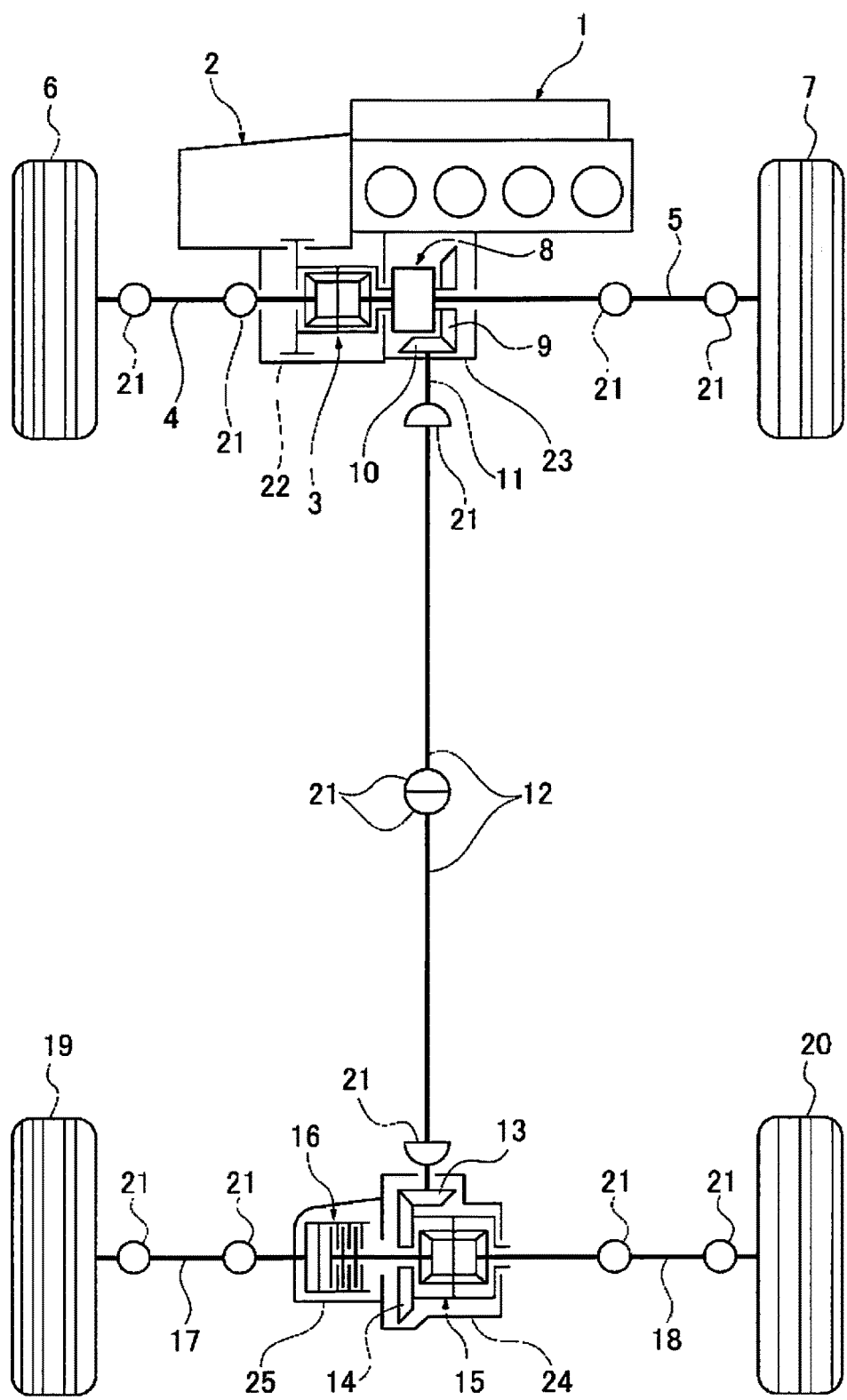
FIG. 1 is a block view of the drive system illustrating the configuration of the drive system of a front wheel drive based four-wheel drive vehicle to which is applied the clutch control device of the first embodiment.

Preferred embodiments for realizing the clutch control device for a four-wheel drive vehicle of the present invention will be described below on the basis of the first embodiment illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment.

Drive System Configuration of the Four-Wheel Drive Vehicle

FIG. 1 illustrates the configuration of the drive system of a front wheel drive based four-wheel drive vehicle to which is applied the clutch control device of the first embodiment. The drive system configuration of the four-wheel drive vehicle will be described below based on FIG. 1.

The front wheel drive system of the four-wheel drive vehicle is provided with a transverse engine 1 (drive source), a transmission 2, a front differential 3, a left front wheel drive shaft 4, a right front wheel drive shaft 5, a left front wheel 6 (main drive wheel), and a right front wheel 7 (main drive wheel), as illustrated in FIG. 1. That is, the drive force is transmitted from the transverse engine 1 and the transmission 2 to the left and right front wheel drive shafts 4, 5 via the front differential 3, and constantly drives the left and right front wheels 6 and 7 while allowing a differential rotation.

The rear wheel drive system of the four-wheel drive vehicle comprises a dog clutch 8 (dog clutch), a bevel gear 9, an output pinion 10, a rear wheel output shaft 11, and a propeller shaft 12, as illustrated in FIG. 1. Further provided are a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). In FIG. 1, a universal joint 21 is provided.

That is, the drive system of the four-wheel drive vehicle is configured to be a drive system a two-wheel drive mode (i.e., disconnected two-wheel drive mode) in which both the dog clutch 8 and the electronically controlled coupling 16 are disengaged, can be selected. In a disengaged state of the dog clutch 8 and the electronically controlled coupling 16, friction loss and oil stirring loss are suppressed and improved fuel efficiency is achieved by arresting the rotation between the ring gear 14 and the bevel gear 9 of the rear wheel drive system.

Figure 2:
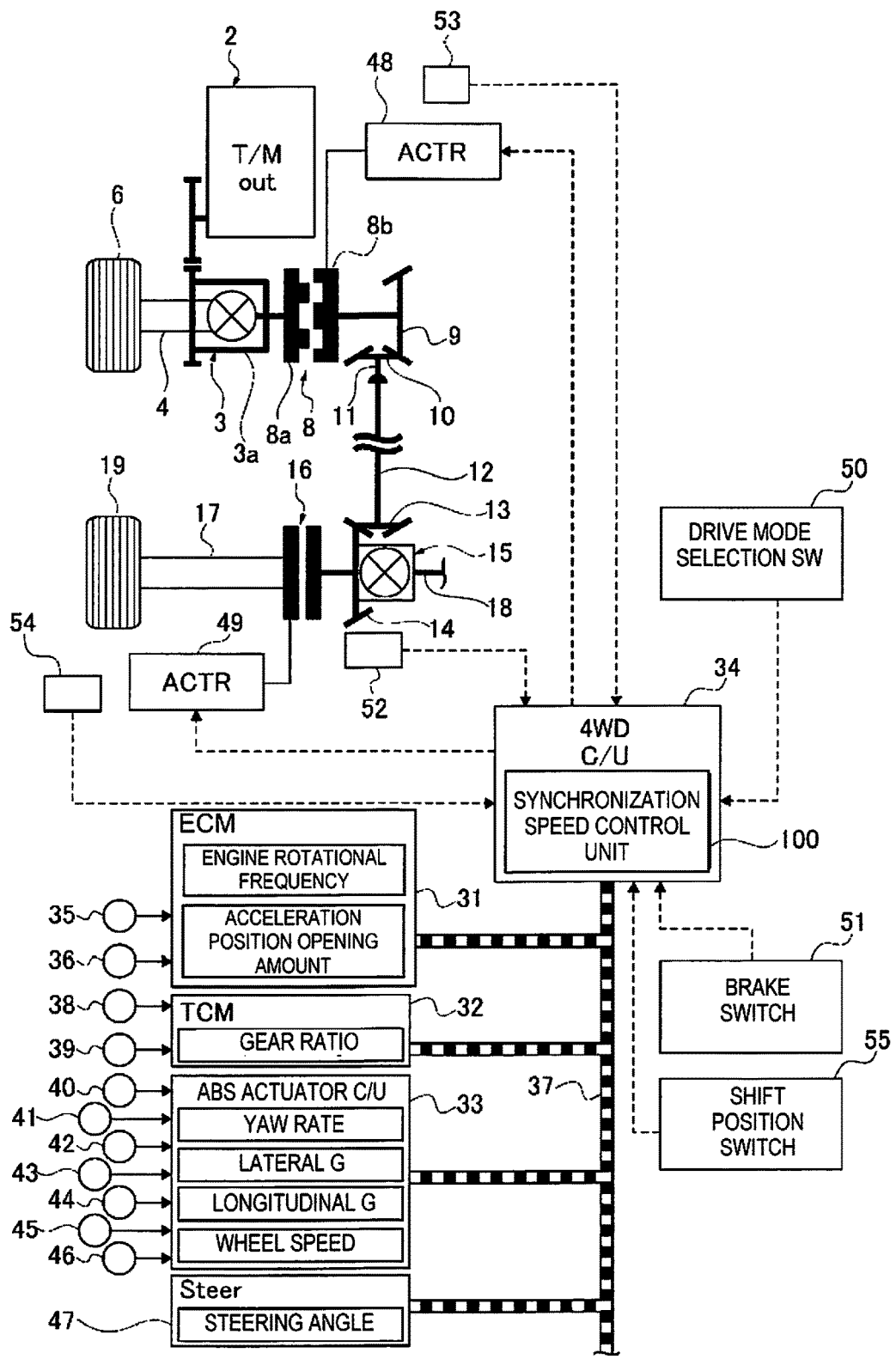
FIG. 2 is a block view of the control system illustrating the configuration of the control system of the front wheel drive based four-wheel drive vehicle to which is applied the clutch control device of the first embodiment.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The dog clutch 8 is disposed in a position upstream of the bevel gear 9 and the output pinion 10, configuring a transfer mechanism, provided at a drive branch position to the left and right rear wheels 19 and 20. In addition, an input side meshing member 8a of the dog clutch 8 illustrated in FIG. 2 is connected to a differential case 3a of the front differential 3, and an output side meshing member 8b of the dog clutch 8 is connected to the bevel gear 9.

Again with reference to FIG. 1, the dog clutch 8, the bevel gear 9, the output pinion 10, and a portion of the rear wheel output shaft 11 are incorporated in a transfer case 23 that is fixed to a position adjacent to the front differential housing 22. For example, a dog clutch in which one of a pair of meshing members 8a and 8b (refer to FIG. 2) is a fixing member and the other is a movable member, in which a biasing member such as a spring that biases in the engagement direction is provided between the fixing member and the movable member, and in which a screw groove that can be fitted with a solenoid pin is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the dog clutch 8 is engaged and the fitting of the solenoid pin with respect to the screw groove is disengaged, the movable member makes a stroke in the engaging direction toward the fixing member due to the biasing force of the spring, or the like, and the teeth of the two 8a and 8b are meshed and engaged.

The electronically controlled coupling 16 is a friction clutch that is provided in a downstream position of the dog clutch 8, and that allocates a portion of the drive force from the transverse engine 1 to the left and right rear wheels 19 and 20, in accordance with the clutch engagement capacity. This electronically controlled coupling 16 is configured to be disposed in the position of the left rear wheel drive shaft 17, which extends to the left rear wheel 19, downstream of the bevel gear 9 and the output pinion 10, which configure the transfer mechanism, via the propeller shaft 12 and the rear differential 15. An input side clutch plate of the electronically controlled coupling 16 is connected to a left side gear of the rear differential 15, and an output side clutch plate is connected to a left rear wheel drive shaft 17.

Also, this electronically controlled coupling 16 is incorporated in a coupling case 25 that is fixed in a position adjacent to the rear differential housing 24. For example, an electronically controlled coupling comprising a multi-plate friction clutch in which a plurality of input-side and output-side plates are alternately arranged, a fixed cam piston (not shown) and a movable cam piston (not shown) which have opposing cam surfaces, and a cam member (not shown) that is interposed between the opposing cam surfaces, is used as this electronically controlled coupling 16.

The engagement of the electronically controlled coupling 16 is carried out by rotating the movable cam piston (not shown) in a predetermined engaging direction with an electric motor (electronically controlled coupling actuator 49 illustrated in FIG. 2). The movable cam piston (not shown) is moved in a clutch engaging direction in accordance with the rotation angle to increase the frictional engagement force of the multi-plate friction clutch, due to a cam action that expands the piston gap. The release of the electronically controlled coupling 16 is carried out by rotating the movable cam piston (not shown) in the opposite direction of the engaging direction with the electric motor (electronically controlled coupling actuator 49 illustrated in FIG. 2). The movable cam piston (not shown) makes a stroke in the clutch disengaging direction in accordance with the rotation angle to decrease the frictional engagement force of the multi-plate friction clutch due to a cam action that reduces the piston gap.

Control System Configuration of the Four-Wheel Drive Vehicle

FIG. 2 illustrates the configuration of the drive system of a front wheel drive based four-wheel drive vehicle to which is applied the clutch control device of the first embodiment. The control system configuration of the four-wheel drive vehicle will be described below based on FIG. 2.

The control system of the four-wheel drive vehicle is provided with an engine control module 31, a transmission control module 32, an ABS actuator control unit 33, and a 4WD control unit 34, as illustrated in FIG. 2. Each of the control modules and each of the control units 31-34 are configured by an arithmetic processing unit, such as a computer.

The engine control module 31 is a control device of the transverse engine 1, which inputs detection signals from an engine rotational frequency sensor 35, an accelerator position opening amount sensor 36, and the like, as vehicle state detection devices. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like, as vehicle state detection devices. Gear ratio information (gear ratio information) is input from this transmission control module 32 to the 4WD control unit 34 via the CAN communication line 37.

The ABS actuator control unit 33 is a control device of an ABS actuator which controls the brake fluid pressure of each wheel, which inputs detection signals from a yaw rate sensor 40, a lateral G sensor 41, a longitudinal G sensor 42, wheel speed sensors 43, 44, 45, 46, and the like, as vehicle state detection devices. Yaw rate information, lateral G information, longitudinal G information, and wheel speed information of each wheel, are input from this ABS actuator control unit 33 to the 4WD control unit 34 via the CAN communication line 37. Besides the information described above, steering angle information from a steering angle sensor 47 is input to the 4WD control unit 34 via the CAN communication line 37.

The 4WD control unit (clutch control unit) 34 is an engagement and disengagement control device of the dog clutch 8 and the electronically controlled coupling 16, and carries out a calculation step based on various input information from each of the sensors as vehicle state detection devices. The control unit outputs drive control commands to a dog clutch actuator 48 (solenoid) and an electronically controlled coupling actuator 49 (electric motor). Here, besides the CAN communication line 37, a drive mode selection switch 50, a brake switch 51 that detects the presence/absence of a brake operation, a ring gear rotational frequency sensor 52, a dog clutch stroke sensor 53, a motor rotation angle sensor 54, a shift position switch 55, and the like are provided as sources of input information.

The drive mode selection switch 50 is a switch with which a driver switches to select between a "2WD mode," a "lock mode," and an "auto mode." When the "2WD mode" is selected, a front wheel drive 2WD state, in which the dog clutch 8 and the electronically controlled coupling 16 are released, is maintained. When the "lock mode" is selected, a full 4WD state, in which the dog clutch 8 and the electronically controlled coupling 16 are engaged, is maintained.

Furthermore, when the "auto mode" is selected, the engagement and disengagement of the dog clutch 8 and the electronically controlled coupling 16 are automatically controlled in accordance with the vehicle state (vehicle speed VSP, accelerator position opening amount ACC). In the present first embodiment, the vehicle speed VSP is basically calculated from the wheel speed of the left and right rear wheels 19 and 20 as the auxiliary drive wheels.

In addition, in "auto mode," there is a choice between an "eco-auto mode" and a "sports auto mode," where the standby two-wheel drive mode, in which the dog clutch 8 is engaged and the electronically controlled coupling 16 is released, will differ depending on the selected mode. That is, when "eco-auto mode" is selected, the electronically controlled coupling 16 is put in a fully released state and waits, and when the "sports auto mode" is selected, the electronically controlled coupling 16 is put in a released state immediately before engagement and waits.

The ring gear rotational frequency sensor 52 is a sensor for acquiring output rotational frequency information of the dog clutch 8 and which calculates the output rotational frequency of the dog clutch 8 by taking into consideration the rear side gear ratio and the front side gear ratio upon calculation with respect to the detected value of the ring gear rotational frequency. The input rotational frequency information of the dog clutch 8 is obtained by calculating the average value of the left and right front wheel speeds.

Drive Mode Switching Configuration

Figure 3:
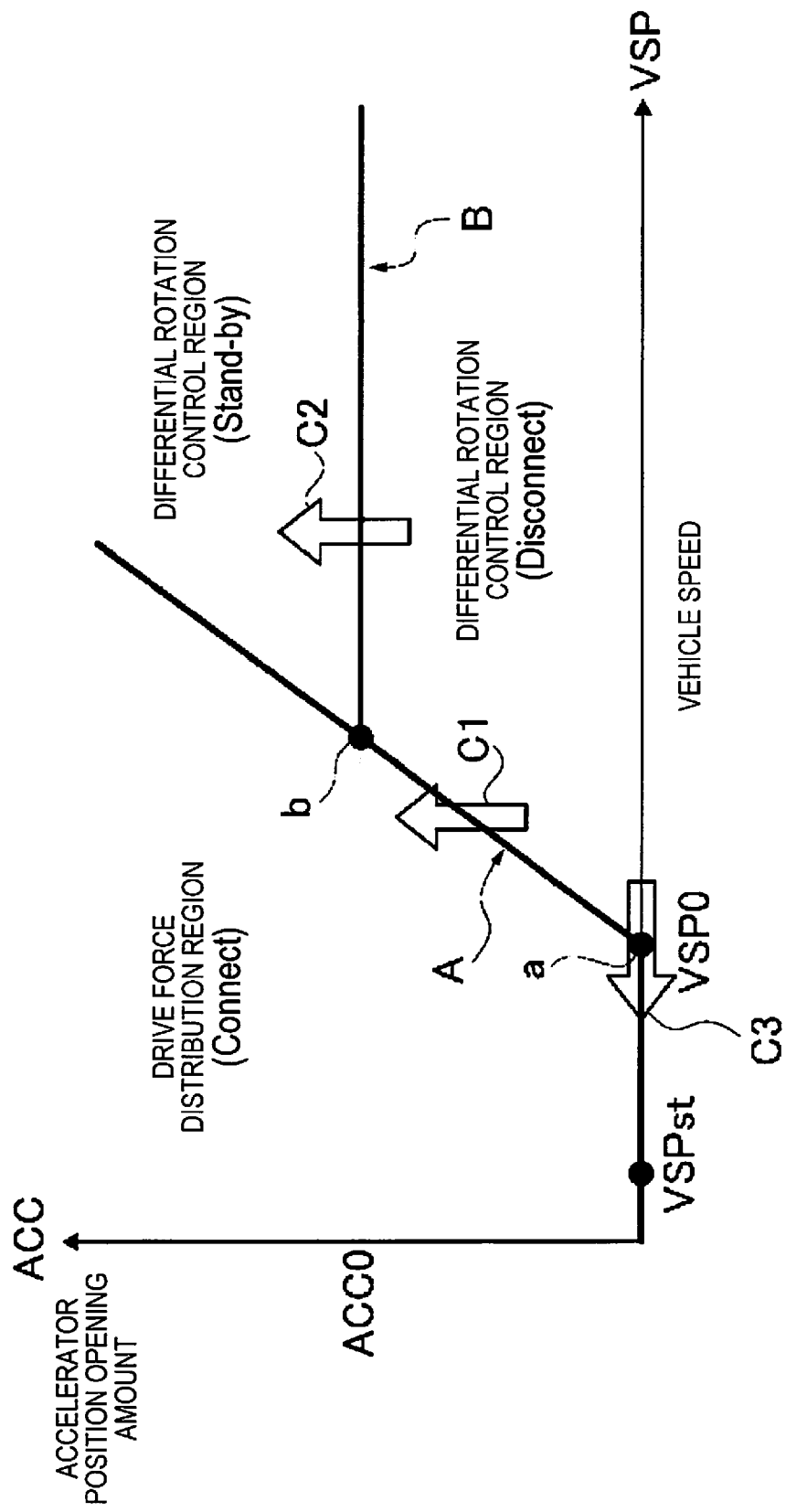
FIG. 3 is a basic map view illustrating a drive mode switching map corresponding to the vehicle speed and the accelerator position opening amount used in the clutch control, when the "auto mode" of the first embodiment is selected.
Figure 4:
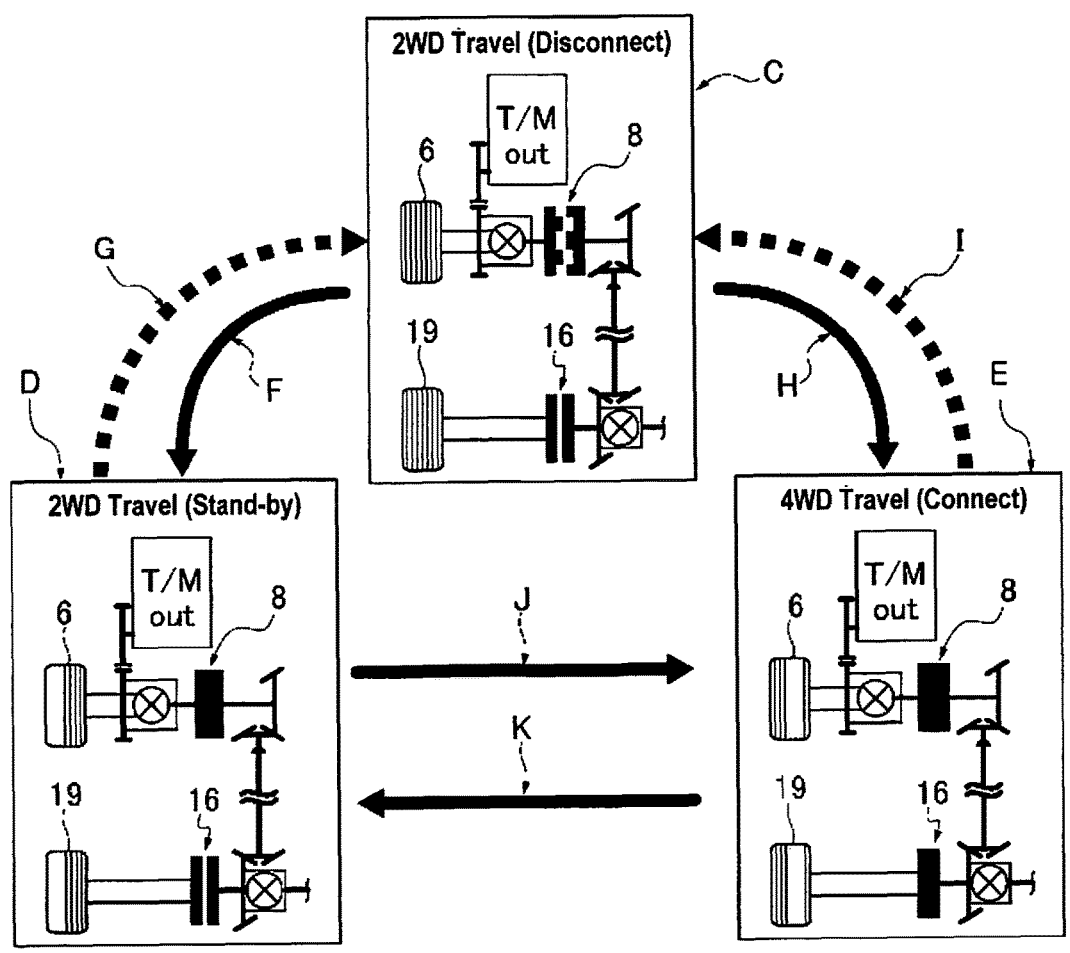
FIG. 4 is a drive mode transition view illustrating the switching transition of the drive mode (disconnected two-wheel drive mode/standby two-wheel drive mode/connected four-wheel drive mode) according to the clutch control by the clutch control device of the first embodiment.

FIG. 3 illustrates a drive mode switching map corresponding to the vehicle speed VSP and the accelerator position opening amount ACC used in the clutch control when "auto mode" is selected, and FIG. 4 illustrates the switching transition of the drive mode (disconnected two-wheel drive mode/standby two-wheel drive mode/connected four-wheel drive mode). The drive mode switching configuration will be described below, based on FIG. 3 and FIG. 4.

That is, the drive mode switching map is set to be separated into a differential rotation control region (Disconnect), which is a control region for the disconnected two-wheel drive mode, a differential rotation control region (Standby), which is a control region for the standby two-wheel drive mode, and a drive force distribution region (Connect), which is a control region for the connected four-wheel drive mode, in accordance with the vehicle speed VSP and the accelerator position opening amount ACC, as illustrated in FIG. 3. These three regions are separated by a region dividing line A in which the accelerator position opening amount ACC is increased proportionally with the increase in the vehicle speed VSP from a base point a of a set vehicle speed VSP0 at which the accelerator position opening amount is zero, and a region dividing line B of a constant accelerator position opening amount ACC0, which is drawn from an intersection b with the region dividing line A toward the high vehicle speed side.

The differential rotation control region (Disconnect), which is a control region for the disconnected two-wheel drive mode, is set in the region in which the accelerator position opening amount ACC is less than or equal to the set opening amount ACC0, and which is surrounded by the vehicle speed axis line on which the accelerator position opening amount ACC is zero, the region dividing line A, and the region dividing line B. That is, the mode is set in a region in which the frequency of occurrence of differential rotation of the left and right front wheels 6 and 7 and the left and right rear wheels 19 and 20 due to wheel slip is extremely low, since the accelerator position opening amount ACC is less than or equal to the set accelerator position opening amount ACC0, and even if wheel slip occurs, the four-wheel drive requirement is low so that the slip increases slowly.

The differential rotation control region (Standby), which is a control region for the standby two-wheel drive mode, is set in the region in which the accelerator position opening amount ACC exceeds the set accelerator position opening amount ACC0, and which is surrounded by the region dividing line A and the region dividing line B. That is, the region is set in a region in which, since the accelerator position opening amount ACC exceeds the set accelerator position opening amount ACC0 but the vehicle speed VSP is in a high vehicle speed region, while the 4WD requirement is low, if differential rotation of the left and right front wheels 6 and 7 and the left and right rear wheels 19 and 20 is generated due to wheel slip, there is a high probability that slip will increase rapidly.

The drive force distribution region (Connect), which is a control region for the connected four-wheel drive mode, is set in the region surrounded by the accelerator position opening amount axis line on which the vehicle speed VSP is zero, the vehicle speed axis line on which the accelerator position opening amount ACC is zero, and the region dividing line A. That is, the mode is set in a region in which the 4WD requirement is high, such as when starting or during high-load travel in which the vehicle speed VSP is low but the accelerator position opening amount ACC is high.

When the disconnected two-wheel drive mode (Disconnect) is selected, the travel mode becomes 2WD travel (Disconnect), in which both the dog clutch 8 and the electronically controlled coupling 16 are released, as illustrated in frame C of FIG. 4. Basically, in this disconnected two-wheel drive mode, a front wheel drive 2WD travel (Disconnect), in which drive force is transmitted only to the left and right front wheels 6 and 7, is maintained. However, if the left and right front wheels 6 and 7 slip during a front wheel drive 2WD travel and the wheel slip amount (or the wheel slip rate) exceeds a threshold value, the electronically controlled coupling 16 is frictionally engaged. Thereafter, if a rotationally synchronized state is determined, differential rotation control to suppress wheel slip is carried out by engaging the dog clutch 8 and allocating drive force to the left and right rear wheels 19 and 20.

When the standby two-wheel drive mode (Standby) is selected, the travel mode becomes 2WD travel (Standby) in which the dog clutch 8 is engaged and the electronically controlled coupling 16 is released, as illustrated in frame D of FIG. 4. Basically, in this standby two-wheel drive mode, a front wheel drive 2WD travel (Standby) in which drive force is transmitted only to the left and right front wheels 6 and 7 is maintained. However, if wheel slip occurs in the left and right front wheels 6 and 7 during front wheel drive 2WD travel and the wheel slip amount (or the wheel slip rate) exceeds a threshold value, only the electronically controlled coupling 16 is frictionally engaged, since the dog clutch 8 is engaged beforehand. Differential rotation control to suppress wheel slip is carried out by allocating drive force to the left and right rear wheels 19 and 20 with good responsiveness, by this frictional engagement of the electronically controlled coupling 16.

When the connected four-wheel drive mode (Connect) is selected, the travel mode becomes 4WD travel (Connect) in which both the dog clutch 8 and the electronically controlled coupling 16 are engaged, as illustrated in frame E of FIG. 4. Basically, in this connected four-wheel drive mode (Connect), a drive force distribution control is carried out which achieves the optimum drive force distribution to the left and right front wheels 6 and 7, and to the left and right rear wheels 19 and 20 that is suited to the road conditions (for example, distribution control to the front and rear wheels at the time of starting). However, if a turning state of the vehicle is determined during 4WD travel from information from the steering angle sensor 47, the yaw rate sensor 40, the lateral G sensor 41, or the longitudinal G sensor 42, a control is carried out in which the engagement capacity of the electronically controlled coupling 16 is decreased to reduce the possibility of the occurrence of a tight corner braking phenomenon.

The switching transition between the 2WD travel (Disconnect), 2WD travel (Standby), and 4WD travel (Connect) in FIG. 4 is carried out by a switching request that is output when the operating point, which is determined by the vehicle speed VSP and the accelerator position opening amount ACC, crosses the region dividing line A and the region dividing line B illustrated in FIG. 3. The switching transition speed of each drive mode is determined so that the transition speed to a drive mode that meets a 4WD request is prioritized over the transition speed to the disconnected two-wheel drive mode that meets a fuel efficiency request. That is, the switching transition speed of 2WD travel (Disconnect)→2WD travel (Standby) (arrow F in FIG. 4) is configured to be fast, and the switching transition speed of 2WD travel (Standby)→2WD travel (Disconnect) (arrow G in FIG. 4) is configured to be slow. Similarly, the switching transition speed of 2WD travel (Disconnect)→4WD travel (Connect) (arrow H in FIG. 4) is configured to be fast and the switching transition speed of 4WD travel (Connect)→2WD travel (Disconnect) (arrow I in FIG. 4) is configured to be slow. In contrast, the switching transition speed of 2WD travel (Standby)→4WD travel (Connect) (arrow J in FIG. 4) is configured to be the same fast speed as the switching transition speed of 4WD travel (Connect)→2WD travel (Standby) (arrow K in FIG. 4).

Clutch Control Configuration

Figure 5:
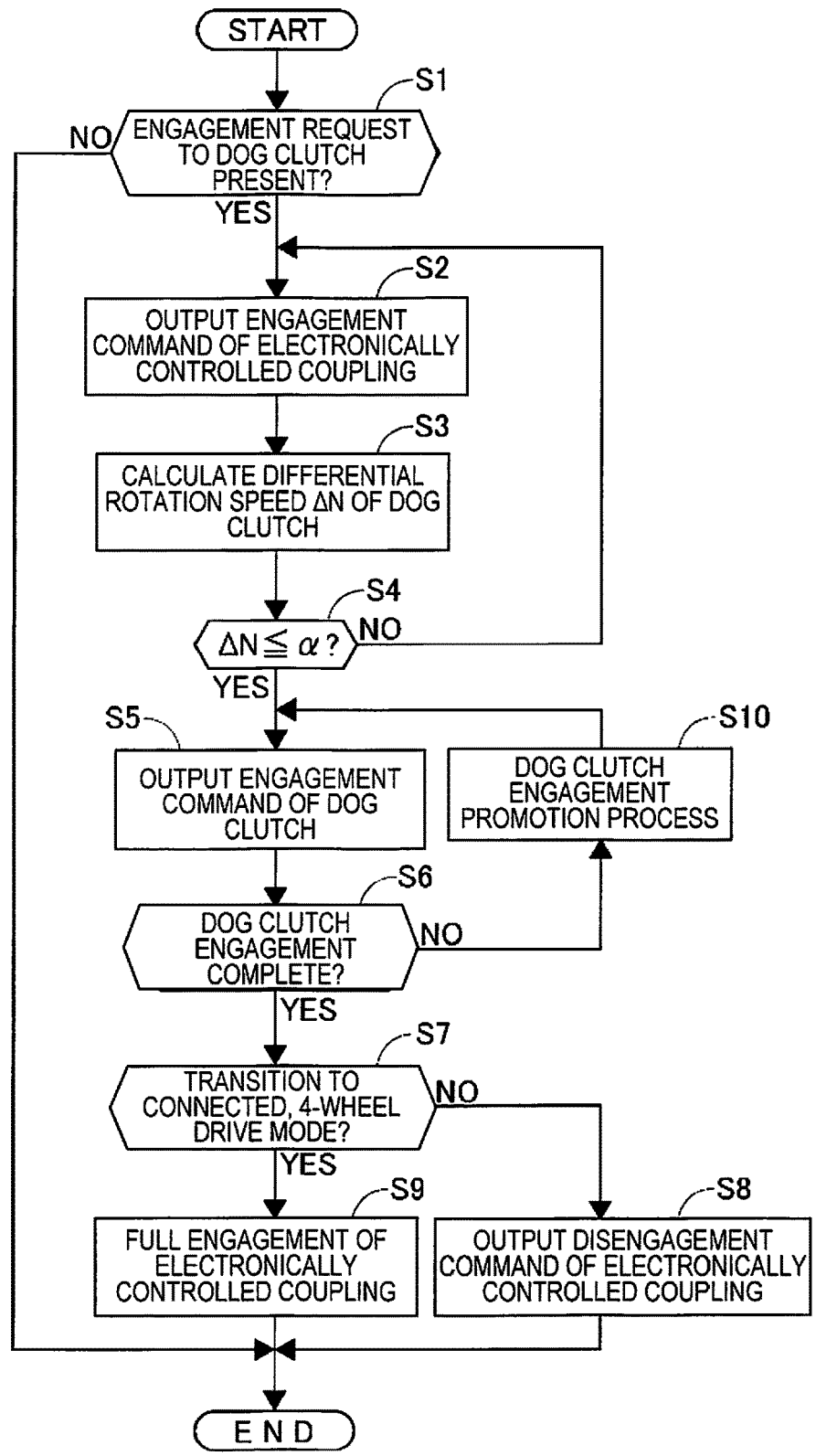
FIG. 5 is a flowchart illustrating the flow of a set of clutch control process during "auto mode" that are executed by the 4WD control unit of the clutch control device for a four-wheel drive vehicle of the first embodiment.

FIG. 5 illustrates the flow process when engaging the dog clutch 8, of the clutch control process that is executed in the 4WD control unit 34. That is, the clutch control process when transitioning to the drive force distribution region (Connect) and when transitioning to the differential rotation control region (Standby), from the differential rotation control region (Disconnect), in which the vehicle state is controlled to the disconnected, two-wheel drive mode, in the drive mode map of FIG. 3, will be described. These clutch control process is repeated at a predetermined cycle of about 10-30 ms.

Each step in FIG. 5 will be described below. In Step S1, it is determined whether or not there is a request to engage the dog clutch 8; when this engagement request is present, the process proceeds to Step S2, and when the engagement request is not present, one set of steps is ended. This request to engage the dog clutch 8 is made when there is a mode transition request to either the connected four-wheel drive mode or the standby two-wheel drive mode.

In Step S2, to which the process proceeds when a request to engage the dog clutch 8 is present, an engagement command of the electronically controlled coupling 16 is output, after which the process proceeds to Step S3. In the following Step S3, the differential rotation speed $\Delta N$ of the input and output side meshing members 8a and 8b of the dog clutch 8 is calculated, after which the process proceeds to Step S4.

In Step S4, it determined whether or not the differential rotation speed $\Delta N$ that is calculated in Step S3 has become less than or equal to a synchronization determination threshold value $\alpha$ which is set in advance, that is, whether or not the dog clutch 8 has been placed in a synchronized state. Then, if $\Delta N \leq \alpha$ (dog clutch synchronized), the process proceeds to Step S5, and if $\Delta N > \alpha$ (dog clutch not synchronized), the process returns to Step S2.

In Step S5, to which the process proceeds when the dog clutch 8 is determined to be synchronized, an engagement command of the dog clutch 8 is output, after which the process proceeds to Step S6. The engagement at this time is an engagement for synchronous rotation of the dog clutch 8, and an engagement with a lower transmission torque than the transmission torque during full engagement in the connected four-wheel drive mode. In Step S6, whether or not the engagement of the dog clutch 8 has been completed is determined. Then, if the engagement has been completed, the process proceeds to Step S7, and if the engagement is incomplete, the process returns to Step S5 after executing a dog clutch engagement promotion step of Step S10. For the determination of engagement completed in Step S6, the engagement is determined to be completed when it is detected that the movable member makes a stroke that exceeds a set amount based on a detection of the dog clutch stroke sensor 53. The dog clutch engagement promotion step of Step S10 will be described further below.

In Step S7, to which the process proceeds at the time of engagement completion of the dog clutch 8, it is determined whether or not the drive mode transition on the basis of the drive mode switching map of FIG. 3 is a transition to the connected four-wheel drive mode. If the transition is to the connected four-wheel drive mode, the process proceeds to Step S9 and the electronically controlled coupling 16 is fully engaged, after which one control is ended. Additionally, if the transition is not to the connected four-wheel drive mode in Step S7, that is, if the transition is to the standby two-wheel drive mode, the process proceeds to Step S8 and a disengagement command of the electronically controlled coupling 16 is output, after which one control is ended.

Next, the dog clutch engagement promotion process in Step S10, to which the process proceeds when the engagement of the dog clutch 8 is incomplete in the above-described Step S6, will be described. This dog clutch engagement promotion process is a process to which the process proceeds when protruding portions such as the teeth, which are the meshing portions, of the input and output side meshing members 8a and 8b of the dog clutch 8 hit each other, and the state enters an engagement standby state in which a further stroke is restricted.

Figure 6:
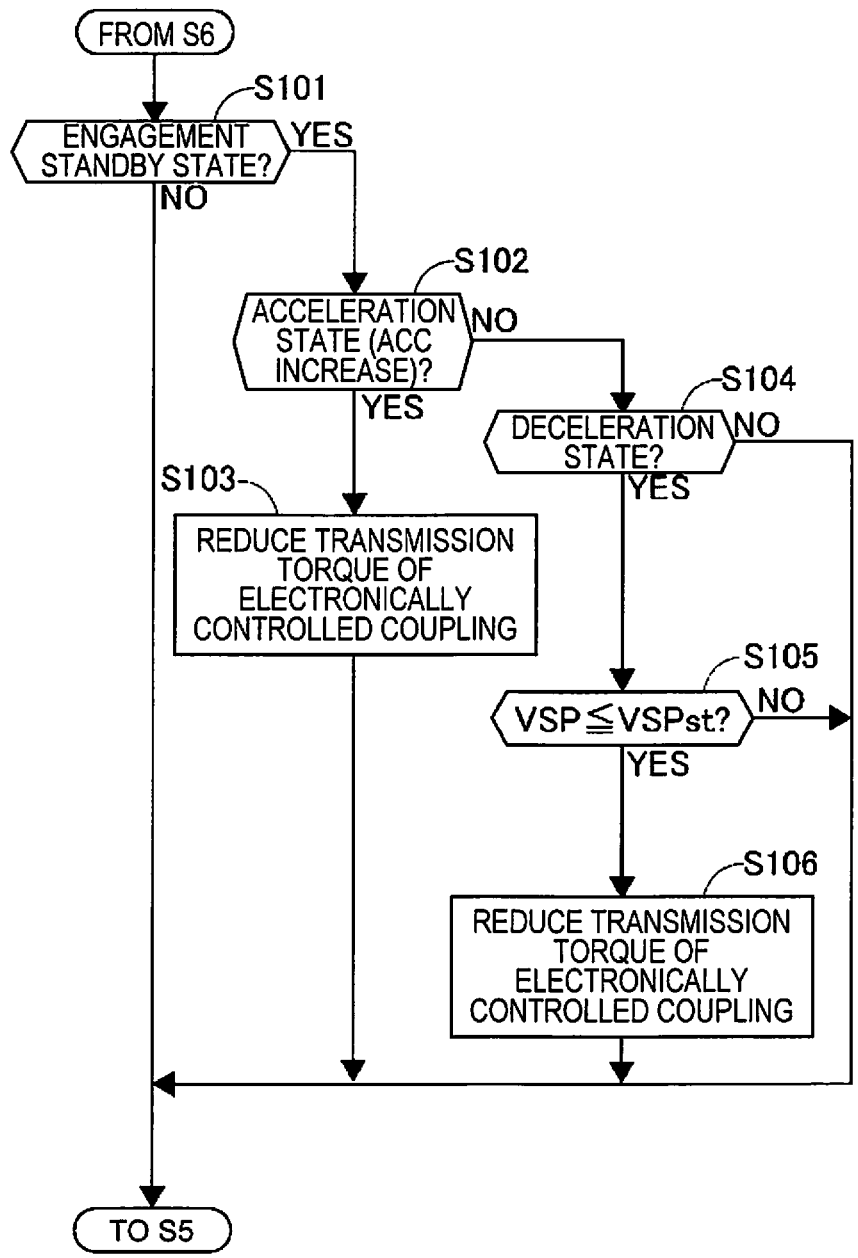
FIG. 6 is a flowchart illustrating the flow of a set of dog clutch engagement promotion process that are executed in Step S10 of FIG. 5 by the clutch control device for a four-wheel drive vehicle of the first embodiment.

This dog clutch engagement promotion process will be described below on the basis of the flowchart of FIG. 6. In Step S101, it is determined whether or not the dog clutch 8 is in an engagement standby state; if in the engagement standby state, the process proceeds to Step S102, and if not in the engagement standby state, a dog clutch differential rotation step is not carried out, and the process returns to Step S5. Here, an engagement standby state is a synchronous rotation state in which the teeth (the convex portions of the concavo-convex features) of the input and output side meshing members 8a and 8b of the dog clutch 8 are impacted. In this case, this engagement standby state is maintained until a differential rotation occurs between the input and output side meshing members 8a and 8b, and the positions of the teeth deviate in the rotational direction. This engagement standby state is detected in an engagement standby state detection section 100 provided to the 4WD control unit 34, when the stroke is stopped in a position that is less than an engagement completed determination value in excess of a predetermined time, based on a detection by the dog clutch stroke sensor 53 described above.

The process after Step S102, to which the process proceeds when the engagement standby state is detected in Step S101, is different between when accelerating and when decelerating. In Step S102, it is determined whether or not the vehicle is in an acceleration state; if in an acceleration state, the process proceeds to Step S103, and if not in an acceleration state, the process proceeds to Step S104. In the present first embodiment, acceleration is determined based on the accelerator position opening amount ACC by determining an acceleration state when the accelerator position opening amount ACC is increasing. That is, the engagement of the dog clutch 8 is carried out when the vehicle state transitions from the differential rotation control region (Disconnect) illustrated in FIG. 3 to either the differential rotation control region (Standby) or the drive force distribution region (Connect). Since this type of drive mode transition of the vehicle state during acceleration becomes a transition of either arrow C1 or C2 in FIG. 3, the determination of acceleration can be determined from an increase in the accelerator position opening amount ACC.

In Step S103, to which the process proceeds when an acceleration state is determined in Step S102, a step to reduce the transmission torque of the electronically controlled coupling 16 is carried out and the process returns to Step S5. This reduction of the transmission torque of the electronically controlled coupling 16 is carried out with a predetermined decrease gradient so that the reduction is gradual. In addition, in the present first embodiment, this decrease gradient is controlled in accordance with the rate of increase of the accelerator position opening amount ACC, so that the decrease gradient will become steeper as the rate of increase is raised. In other words, the response speed is prioritized during acceleration.

Next, in Step S104, to which the process proceeds when a non-acceleration state is determined in Step S102, it is determined whether or not the vehicle is in a deceleration state; if in a vehicle deceleration state, the process proceeds to Step S105, and if not in a vehicle deceleration state, the process returns to Step S5. That is, in this Step S104, it is determined whether or not the drive mode transition is a transition in the arrow C3 direction on the drive mode switching map of FIG. 3, and the process proceeds to Step S105 if the transition is in the arrow C3 direction.

In Step S105, to which the process proceeds when the vehicle is in a deceleration state, it is determined whether or not the vehicle speed VSP has been reduced to less than or equal to a vehicle speed threshold value VSPst that is set in advance; if VSP≤VSPst, the process proceeds to Step S106, and if VSP>VSPst, the process returns to Step S5. The vehicle speed threshold value VSPst is a vehicle speed at which it is possible to contain the engagement shock that is generated when the dog clutch 8 is engaged in a non-synchronized state within a desired range, and the value is set to a vehicle speed in the vicinity of speeds immediately preceding stopping.

In Step S106, to which the process proceeds when the vehicle speed VSP is reduced to less than or equal to the vehicle speed threshold value VSPst, a step to reduce the transmission torque of the electronically controlled coupling 16 is carried out, and the process returns to Step S5. This reduction of the transmission torque may be carried out by reducing the transmission torque to zero in an ON/OFF manner, or by gradual reduction. In short, in a situation in which the vehicle speed VSP is less than or equal to the vehicle speed threshold value VSPst, the transmission torque is reduced so that a differential rotation is reliably generated in the dog clutch 8 before the vehicle is stopped. Here, in the first embodiment, the reduction of the transmission torque is carried out with an ON/OFF-like steep gradient so as to engage the dog clutch 8 in a short period of time, as described below. On the other hand, if the transmission torque is gradually reduced, it is possible to further reduce the generation of engagement shock described below.

As described in the foregoing, in the dog clutch engagement promotion step of Step S10, the transmission torque of the electronically controlled coupling 16 is reduced in Step S103 or S106. Accordingly, the distribution of drive force to the left and right rear wheels 19 and 20 is reduced, and a differential rotation ΔN occurs between the input and output side meshing members 8a and 8b of the dog clutch 8. Therefore, when the dog clutch 8 is in an engagement standby state, the two meshing members 8a and 8b are relatively displaced in the rotational direction, the positions of the teeth which are in a state of impact are displaced, and the movable member is moved in the engagement direction by a biasing force of an elastic member such as a spring, allowing the completion of engagement.

Actions of the First Embodiment

Figure 7:
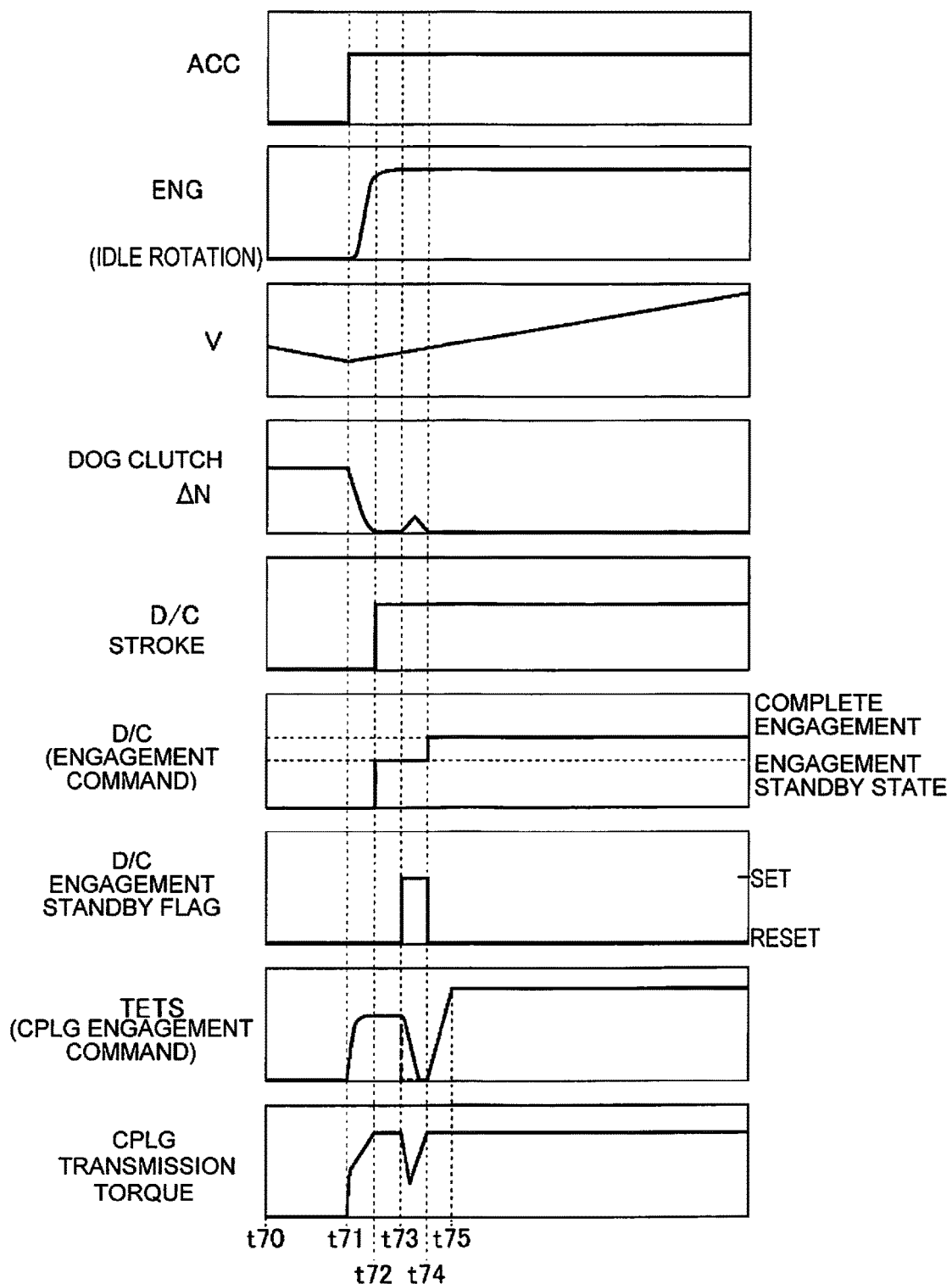
FIG. 7 is a time chart illustrating an example of an operation during acceleration by the clutch control device for a four-wheel drive vehicle of the first embodiment.
Figure 8:
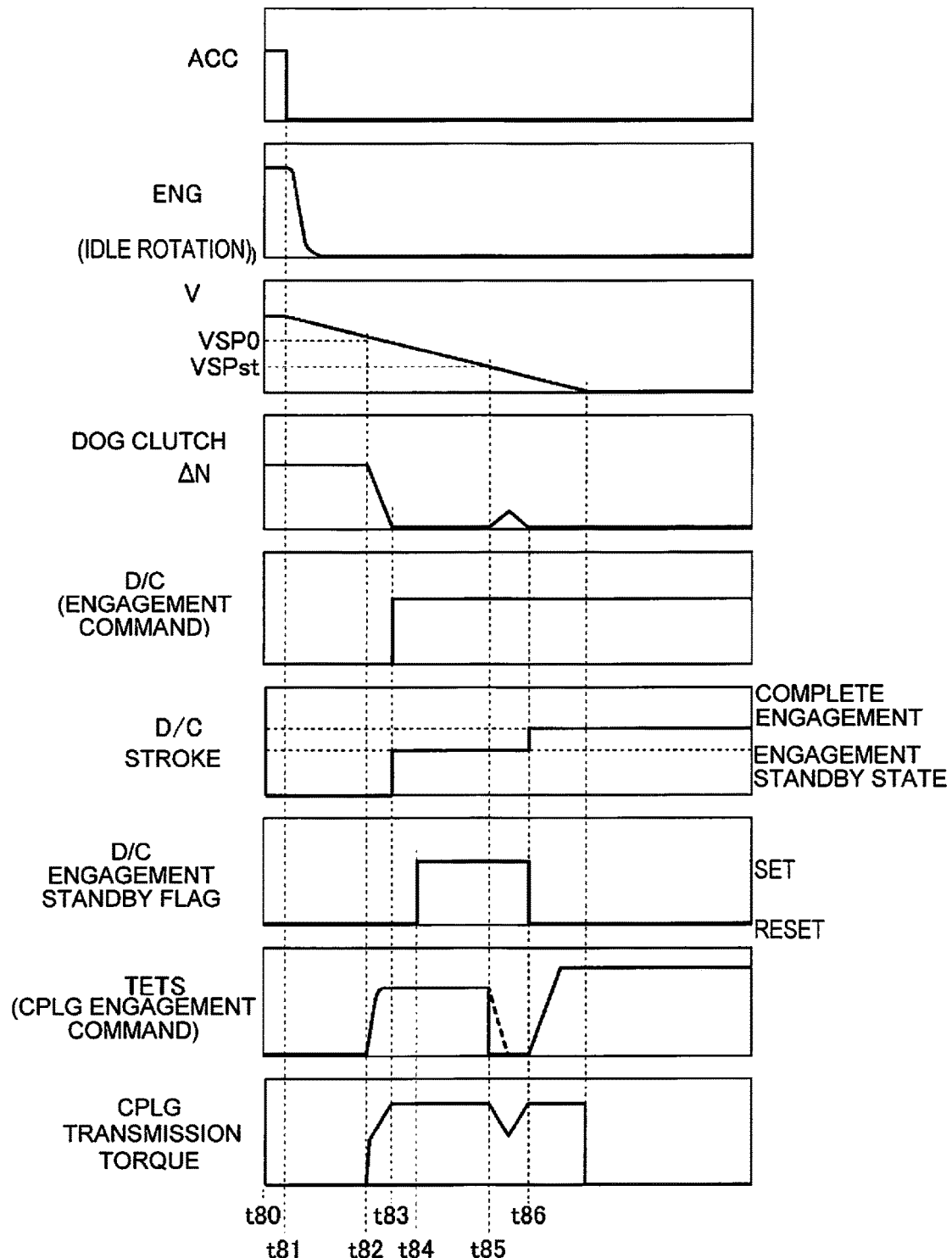
FIG. 8 is a time chart illustrating an example of an operation during deceleration by the clutch control device for a four-wheel drive vehicle of the first embodiment, as well as illustrating the decrease gradient when the engagement command output is reduced in the second embodiment.

Next, the actions of the first embodiment will be described on the basis of the time charts of FIGS. 7 and 8. The two time charts illustrate the operation of engagement of the dog clutch 8 in order to switch from the disconnected two-wheel drive mode to the standby two-wheel drive mode or the connected four-wheel drive mode. FIG. 7 illustrates an example of operation during acceleration, and FIG. 8 illustrates an example of operation during deceleration.

First, the operation during acceleration of FIG. 7 will be described. In the drawing, the vehicle is traveling in the disconnected two-wheel drive mode from time t70 to time t71. At time t71, the driver depresses an accelerator pedal (not shown) and the accelerator position opening amount ACC increases. Because the vehicle state (accelerator position opening amount ACC and vehicle speed VSP) crosses the region dividing line A on the drive mode switching map illustrated in FIG. 3 as indicated by the arrow C1, a switch control to the connected four-wheel drive mode is determined.

Thus, process to engage the dog clutch 8 is executed. First, at time t71, the electronically controlled coupling 16 is engaged (process of Steps S1→S2). At this time, an engagement command output TETS for generating transmission torque that is capable of synchronizing the dog clutch 8 is output to the electronically controlled coupling 16.

With the engagement of this electronically controlled coupling 16, the differential rotation ΔN between the input side meshing member 8a and the output side meshing member 8b of the dog clutch 8 is reduced, and the differential rotation ΔN becomes less than or equal to a synchronization determination threshold value α (≈0) at time t72. An engagement command is thereby output to the dog clutch 8 (on the basis of the process of Step S3-S5).

However, in this operation example, the dog clutch 8 is in an engagement standby state, in which the teeth of the input and output side meshing members 8a and 8b are hitting each other, and further stroke is restricted. If this engagement standby state of the dog clutch 8 is maintained, the drive mode is not switched to the connected four-wheel drive mode, and the acceleration performance by the four-wheel drive is not secured, which is the object of the switching of the drive mode.

Therefore, in the present first embodiment, an engagement standby state detecting section 100 detects the engagement standby state of the dog clutch 8 at time t73 and sets an engagement standby flag. In the present first embodiment, the setting of this engagement standby flag is carried out after a predetermined time has elapsed after the stroke of the movable member of the dog clutch 8 is stopped before the full engagement position, but the setting may be carried out at the same time that a stroke stop is detected. Then, a step to reduce the transmission torque of the electronically controlled coupling 16 is executed immediately in accordance with the setting of this engagement standby flag (Step S102-S103), which is accompanied by an occurrence of differential rotation ΔN between the two meshing members 8a and 8b of the dog clutch 8.

Therefore, in the dog clutch 8, the positions of the meshing portions of the two meshing members 8a and 8b are shifted in the rotational direction, the dog clutch is engaged at time t74, and the engagement standby flag is reset. Then, from time t75, a full engagement command is output to the electronically controlled coupling 16 (on the basis of the set of Steps S6→S7→S9), and the mode is controlled to the connected four-wheel drive mode. Therefore, after time t75, when the electronically controlled coupling 16 is fully engaged, the state is a four-wheel drive state, and a more stable acceleration can be carried out compared to a two-wheel drive state. Accordingly, since the dog clutch 8 is fully engaged by reducing the transmission torque of the electronically controlled coupling 16 at the time that an engagement standby state of the dog clutch 8 is detected, it is possible to switch to the connected four-wheel drive mode at an early stage. Therefore, a stable, four-wheel drive acceleration becomes possible. Since the driver is performing an acceleration operation while accelerating, and since the driving sound of the engine 1 and the like is accordingly increased, even if a shock is generated when the dog clutch 8 is engaged, sound and vibration due to the engagement shock is not likely to impart discomfort to the driver.

Even if the state of the vehicle state undergoes a transition as indicated by the arrow C2 in FIG. 3, the dog clutch 8 is engaged in the same way as described above. In this case, even when an engagement standby state of the dog clutch 8 is detected, the electronically controlled coupling 16 is released after fully releasing the dog clutch 8 by means of the same process as indicated above. In this case as well, by switching to the standby two-wheel drive mode at an early stage, it becomes possible instantly to carry out a transition to the four-wheel drive state when a differential rotation ΔV is generated between the left and right front wheels 6 and 7 and the left and right rear wheels 19 and 20.

Next, the operation during deceleration will be described on the basis of FIG. 8. In the drawing, the vehicle is traveling in the disconnected two-wheel drive mode at time t80. Then, the foot of the driver is removed from the accelerator pedal (not shown) at time t81 to effect a deceleration at accelerator position opening amount ACC=0.

With this deceleration, at time t82, the vehicle speed VSP crosses the region dividing line A on the drive mode switching map of FIG. 3 as indicated by the arrow C3, and the vehicle state makes a transition to the drive force distribution region (Connect). Therefore, the 4WD control unit 34 outputs an engagement command (on the basis of the process of Steps S1→S2) for synchronous rotation of the dog clutch 8 to the electronically controlled coupling 16, in order to switch to the connected four-wheel drive mode in preparation for the next start.

The differential rotation ΔN of the dog clutch 8 is thereby reduced, and the differential rotation ΔN becomes less than or equal to the synchronization determination threshold value α (≈0) at time t83, at which point an engagement command is being output to the dog clutch 8 (on the basis of the process of Steps S3-S5).

In this operation example, the dog clutch 8 is in an engagement standby state, in which the teeth of the input and output side meshing members 8a and 8b are striking each other; at time t84, the engagement standby state detecting section 100 detects an engagement standby state of the dog clutch 8 and sets an engagement standby flag.

During such deceleration, if the vehicle is stopped while an engagement standby state of the dog clutch 8 is maintained, the drive mode is not switched to the connected four-wheel drive mode, and stable accelerated travel in a four-wheel drive mode cannot be secured at the time of the next start. On the other hand, if the transmission torque of the electronically controlled coupling 16 is reduced and the dog clutch 8 is engaged at the same time that an engagement standby flag is set, as in the control during acceleration described above, there is the risk of imparting discomfort to the driver by the engagement shock generated when the dog clutch 8 is engaged. That is, during deceleration in which the accelerator position opening amount ACC=0, the driving noise, such as that from the engine 1, is reduced; in addition, the friction on the left and right rear wheels 19 and 20 side of the drive transmission system is added as engine braking following the engagement of the dog clutch 8, which tends to increase the engagement shock and to make sound and vibration more noticeable.

Therefore, in the present first embodiment, the timing for reducing the transmission torque of the electronically controlled coupling 16 during deceleration is configured to be immediately before stopping of the vehicle. That is, during deceleration, the transmission torque of the electronically controlled coupling 16 is reduced at time t85 when the vehicle speed VSP has decreased to the vehicle speed threshold value VSPst (on the basis of the process of Steps S105→S106). A differential rotation ΔN is thereby generated between the input and output side meshing members 8a and 8b of the dog clutch 8, and, at time t86, the dog clutch 8 is engaged and the engagement standby flag is reset. Since the vehicle is in a low-speed travel state immediately before stopping at the time of this engagement of the dog clutch 8, even if the engagement is carried out in a state in which a differential rotation ΔN has occurred, the magnitude of the generated engagement shock can be significantly reduced compared to engagement when an engagement standby flag is set.

Furthermore, the transmission torque of the electronically controlled coupling 16 is increased from time t86, entering a full engagement state (on the basis of Steps S6-S7-S9). Therefore, the connected four-wheel drive mode can be reliably set before the vehicle is stopped, and at the time of the next start, the vehicle can be reliably started in the connected four-wheel drive mode, allowing a more stable starting acceleration compared to starting when in a two-wheel drive mode.

In the present first embodiment, an example was described in which the connected four-wheel drive mode is set at the time of vehicle stop; however, it may be configured so that the standby two-wheel drive mode is set, when on the horizontal axis on which the accelerator position opening amount ACC becomes zero, in the control region to the connected four-wheel drive mode. In this case, if an engagement of the dog clutch 8 is detected after time t86, the electronically controlled coupling 16 is released. In this manner, even if the accelerator position opening amount ACC is controlled to be zero, when an accelerator pedal (not shown) is depressed at the time of the next start, it is possible to engage the electronically controlled coupling 16 and immediately enter the connected four-wheel drive mode, making it possible to secure stable travel when starting.

Effects of the First Embodiment

Both the effects and actions of the clutch control device for a four-wheel drive vehicle of the first embodiment are listed together below.

1) In the clutch control device for a four-wheel drive vehicle of the first embodiment, in a four-wheel drive vehicle, in which, of left and right front wheels 6 and 7 and left and right rear wheels 19 and 20, the left and right front wheels 6 and 7 as one pair are set as main drive wheels which are connected to an engine 1 as a drive source and the left and right rear wheels 19 and 20 as the other pair are set as auxiliary drive wheels which are connected to the engine 1 via a clutch, comprising plural clutches, that is, a dog clutch 8 as a dog clutch and an electronically controlled coupling 16 as a friction clutch that are respectively arranged separately in a drive branch-side transmission system path and in an auxiliary drive wheel-side transmission system path which sandwich a differential 15, of a system for transmitting drive force to the left and right rear wheels 19 and 20 as the auxiliary drive wheels, wherein the dog clutch 8 separates the system for transmitting drive force to the left and right rear wheels 19 and 20 from the system for transmitting drive force to the left and right front wheels 6 and 7 by releasing the clutch, and the electronically controlled coupling 16 allocates a portion of the drive force from the engine 1 to the left and right rear wheels 19 and 20 in accordance with a clutch engagement capacity, wherein a 4WD control unit 34 is provided as a clutch control unit for carrying out a control to engage the dog clutch 8, which carries out the engagement and disengagement control of the dog clutch 8 and the engagement and disengagement control of the electronic controlled coupling 16 in accordance with the vehicle state that is detected by each of the sensor switches 35, 36, 38-47, 50-55 as vehicle state detection devices, and which can switch between a two-wheel drive mode in which only the left and right front wheels 6 and 7 are driven and a four-wheel drive mode in which the left and right front wheels 6 and 7 and the left and right rear wheels 19 and 20 are driven, and that carries out a control to engage the dog clutch 8 after engaging the electronically controlled coupling 16 and synchronizing the dog clutch 8, and wherein the vehicle state detection devices are provided with an engagement standby state detecting section 100 as a wait state sensor that detects an engagement standby state in which the engagement is incomplete at the time of an engagement operation of the dog clutch 8, and when an engagement standby state is detected when engaging the dog clutch 8, the 4WD control unit 34 reduces the transmission torque of the electronically controlled coupling 16. The 4WD control unit 34 carries out a control to engage the dog clutch 8 after engaging the electronically controlled coupling 16 and synchronizing the dog clutch 8, when engaging the dog clutch 8. At this time, there are cases in which the dog clutch 8 is synchronized in an engagement standby state, which is a state in which the teeth of the two meshing members 8a and 8b are striking each other and are not engaged. Therefore, when such an engagement standby state is detected, the transmission torque of the electronically controlled coupling 16 is reduced, thereby reducing the distribution of drive force to the left and right rear wheels 19 and 20 as the auxiliary drive wheels, generating a differential rotation $\Delta N$ between the two meshing members 8a and 8b of the dog clutch 8. With this differential rotation $\Delta N$, the positions of the two meshing members 8a and 8b of the dog clutch 8 are displaced, which eliminates the engagement standby state, and a movable member is moved by a biasing force of a biasing member such as a spring, allowing the dog clutch 8 to be engaged. In this manner, in the present first embodiment, by controlling the electronically controlled coupling 16, it is possible reliably to engage the dog clutch 8 at an early stage, compared to when engaging the dog clutch 8 after a differential rotation $\Delta N$ has occurred due to a change in the travel load, which accompanies travel.

2) In the clutch control device for a four-wheel drive vehicle of the first embodiment, the 4WD control unit 34 executes a control to switch from the disconnected two-wheel drive mode, in which the dog clutch 8 and the electronically controlled coupling 16 are released, to a drive mode in which the dog clutch 8 is engaged during acceleration of the vehicle. Therefore, when in two-wheel drive, it is possible to reduce the friction more on the left and right rear wheels 19 and 20 side than on the dog clutch 8 side, in order to achieve an improvement in fuel efficiency. By allowing the dog clutch to be reliably engaged when changing the drive mode from the disconnected two-wheel drive mode, which has excellent fuel efficiency, it becomes possible to reliably switch the drive mode at an early stage.

3) In the clutch control device for a four-wheel drive vehicle of the first embodiment, the 4WD control unit 34 is provided with as drive modes in which the dog clutch 8 is engaged, a connected four-wheel drive mode in which the dog clutch 8 and the electronically controlled coupling 16 are engaged, and a standby two-wheel drive mode in which the dog clutch 8 is engaged and the electronically controlled coupling 16 is released, and when controlling the mode to the standby two-wheel drive mode, the 4WD control unit releases the electronically controlled coupling 16 after engaging the dog clutch 8. Therefore, when shifting from the disconnected two-wheel drive mode to the standby two-wheel drive mode or the connected four-wheel drive mode described above, the transition to the two modes can be reliably carried out at an early stage by reliably engaging the dog clutch 8 at an early stage, as described in 1) above. In addition, when in the standby two-wheel drive mode, it is possible to shift to the connected four-wheel drive mode by simply engaging the electronically controlled coupling 16. In this standby two-wheel drive mode, it is possible to transition to the connected four-wheel drive mode in a short period of time, compared to when the vehicle is in the disconnected two-wheel drive mode. Therefore, during acceleration, it is possible to better secure travel stability, compared to when the vehicle is in the disconnected two-wheel drive mode. Therefore, when shifting from the disconnected two-wheel drive mode to the standby two-wheel drive mode or the connected four-wheel drive mode, the switching of the drive can be reliably carried out by reliably engaging the dog clutch 8, as described in 1) or 2) above.

4) In the clutch control device for a four-wheel drive vehicle of the first embodiment, the 4WD control unit 34 carries out a switching control of the drive modes based on a drive mode switching map, as illustrated in FIG. 3, according to the accelerator position opening amount and the vehicle speed, in which are set a differential rotation control region (Disconnect), which is a control region for the disconnected two-wheel drive mode set in a low accelerator position opening amount/high vehicle speed region, a differential rotation control region (Standby), which is a control region for the standby two-wheel drive mode set in a higher accelerator position opening amount region than the control region for the disconnected two-wheel drive mode, and a drive force distribution region (Connect), which is a control region for the connected four-wheel drive mode set in a higher accelerator position opening amount/lower vehicle speed region than the control region for the disconnected two-wheel drive mode. Therefore, during acceleration in which the accelerator position opening amount is increased, the mode is switched from the disconnected two-wheel drive mode to the standby two-wheel drive mode or to the connected four-wheel drive mode. At this time, it is possible to switch the drive mode by reliably engaging the dog clutch 8, as described in 1)-3) above. On the other hand, during deceleration from the disconnected two-wheel drive mode, it is possible to increase the braking force by engine braking by switching to the connected four-wheel drive mode; in addition, it is a simple matter for control to be executed so as to secure travel stability as the connected four-wheel drive mode at the time of the next start.

5) In the clutch control device for a four-wheel drive vehicle of the first embodiment, when reducing the transmission torque of the electronically controlled coupling 16, the 4WD control unit 34 reduces the transmission torque to the degree that a differential rotation $\Delta N$ is generated between the input side meshing member 8a on the drive source side and the output side meshing member 8b on the auxiliary drive source side of the dog clutch 8. It is thereby possible to reliably generate a differential rotation between the two meshing members 8a and 8b of the dog clutch 8 to eliminate synchronization and reliably achieve engagement.

6) In the clutch control device for a four-wheel drive vehicle of the first embodiment, the 4WD control unit 34 gradually reduces the transmission torque of the electronically controlled coupling 16 during acceleration over time, as illustrated in FIG. 7. Therefore, it is possible to better suppress the rate of occurrence of differential rotation $\Delta N$ in the dog clutch 8 compared to when the transmission torque of the electronically controlled coupling 16 is reduced at once. It is thereby possible to suppress the generation of sound and vibration caused by engagement shock that is generated when the dog clutch 8 shifts from an engagement standby state to an engaged state. In the present first embodiment, the command to reduce the transmission torque of the electronically controlled coupling 16 during acceleration is configured so that the reduction takes place gradually from time t72, as indicated by the solid line in FIG. 7. However, the invention is not limited thereto; the reduction may take place instantaneously, as indicated by the dotted line in the drawing. That is, the engagement shock that occurs when engaging the dog clutch 8 after a differential rotation is generated when accelerating is less likely to impart discomfort to the driver compared to when decelerating. Therefore, the switching speed of the drive mode may be prioritized by instantaneously reducing the transmission torque and increasing the engagement responsiveness of the dog clutch 8.

7) In the clutch control device for a four-wheel drive vehicle of the first embodiment, when an engagement standby state is detected at the time of engaging the dog clutch 8 in a deceleration state of the vehicle, the 4WD control unit 34 reduces the transmission torque of the electronically controlled coupling 16 after waiting for the vehicle speed VSP to drop below a vehicle speed threshold value VSPst, which is set in advance. Therefore, if an engagement standby state is entered when the dog clutch 8 is engaged in a vehicle deceleration state, the transmission torque of the electronically controlled coupling 16 is reduced after waiting for the vehicle speed to drop below the vehicle speed threshold value VSPst; with the reduction in the transmission torque of the electronically controlled coupling 16, a differential rotation ΔN is generated in the dog clutch 8, which eliminates the engagement standby state so that engagement can be achieved. In this manner, if the dog clutch 8 is engaged in a state in which differential rotation is generated, there is the risk that engagement shock occurs, and engagement shock tends to be more significant during deceleration than during acceleration. However, in the present first embodiment, since engagement is carried out after waiting for the vehicle speed VSP to drop below the vehicle speed threshold value VSPst, it is possible to better suppress the generation of engagement shock compared to engagement at a vehicle speed above the vehicle speed threshold value VSPst.

8) In the clutch control device for a four-wheel drive vehicle of the first embodiment, a drive mode switch control is carried out in accordance with the vehicle speed VSP, wherein the mode is controlled to the disconnected two-wheel drive mode in which the dog clutch 8 and the electronically controlled coupling 16 are released when the vehicle speed VSP is in a vehicle speed region above the region dividing line A as a mode switch vehicle speed that is set in advance, and the mode is switched to the connected four-wheel drive mode in a vehicle speed region below the region dividing line A as the mode switch vehicle speed, and the vehicle speed threshold value VSPst is set to a value that is lower than the mode switch vehicle speed set in the region dividing line A. Therefore, when in the disconnected two-wheel drive mode in which the dog clutch 8 is released, if the vehicle speed VSP drops below the region dividing line A, the dog clutch 8 is engaged in order to switch to the connected four-wheel drive mode. When the dog clutch 8 is placed in an engagement standby state at the time of this mode switch, it is possible to engage the dog clutch 8 while suppressing engagement shock as described in 7) above, by waiting for the vehicle speed to reach the vehicle speed threshold value VSPst, which is a vehicle speed below the region dividing line A. In addition, when there is a switching of the drive mode that releases the dog clutch 8 before the vehicle speed VSP decreases to the vehicle speed threshold value VSPst, it is possible to release the dog clutch 8 before the vehicle speed is decreased to the vehicle speed threshold value VSPst in order to reduce the frequency of engagement of the dog clutch 8 due to differential rotation. It thereby becomes advantageous in terms of durability of the dog clutch 8.

9) In the clutch control device for a four-wheel drive vehicle of the first embodiment, the vehicle speed threshold value VSPst is set to a value with which the engagement shock that is generated when engaging the dog clutch 8 is suppressed within an allowable range. Therefore, it is possible to suppress the engagement shock that is generated when forming a differential rotation ΔN to engage the dog clutch 8 by reducing the transmission torque of the electronically controlled coupling 16 within an allowable range.

10) In the clutch control device for a four-wheel drive vehicle of the first embodiment, the dog clutch 8 as the dog clutch is disposed in a position upstream of a bevel gear 9 and an output pinion 10, configuring a transfer mechanism, provided at a drive branch position to the left and right rear wheels 19 and 20, as the auxiliary drive wheels, and the electronically controlled coupling 16 as the friction clutch is disposed in the position of the left rear wheel drive shaft 17, which extends to the left rear wheel 19 as an auxiliary drive wheel, downstream of the bevel gear 9 and output pinion 10, as the transfer mechanism, via the propeller shaft 12 and the rear differential 15. Accordingly, in a front wheel drive based four-wheel drive vehicle, when the "disconnected two-wheel drive mode" is selected, it is possible to effectively suppress friction loss and oil stirring loss in order to achieve an improvement in fuel efficiency.

Other Embodiments

Other embodiments of the present invention will now be described. Since the other embodiments are modified examples of the first embodiment, configurations common to the first embodiment have been assigned the same reference symbols as the first embodiment and the descriptions thereof are omitted, while describing only the differences from the first embodiment.

Second Embodiment

The second embodiment is an embodiment in which, when reducing the transmission torque of the electronically controlled coupling 16 in an engagement standby state during deceleration, the reduction is carried out gradually over time. That is, in FIG. 8, when reducing the engagement command output TETS from time t85, the reduction is carried out at a predetermined decrease gradient, as indicated by the dotted line in the drawing. In this case, the decrease gradient may be constant or variable in accordance with the deceleration degree. If variable, the decrease gradient may be made gradual when the deceleration degree is high in order to suppress engagement shock. Or, conversely, the decrease gradient may be made steep in order to increase responsiveness when the deceleration degree is large; the decrease gradient may be appropriately set according to the vehicle characteristics or the set speed of the vehicle speed threshold value VSPst.

2-1) In the clutch control device for a four-wheel drive vehicle of the second embodiment, the 4WD control unit 34 reduces the transmission torque of the electronically controlled coupling 16 in an engagement standby state during deceleration by reducing with a gradient that decreases with time. Therefore, when generating a differential rotation ΔN in the dog clutch 8 by reducing the transmission torque of the electronically controlled coupling 16, it is possible to generate a differential rotation ΔN gradually, so as to better suppress engagement shock compared to an instantaneous reduction in transmission torque.

Third Embodiment

The third embodiment is an embodiment in which, when carrying out a drive mode switch control that releases the dog clutch 8 when an engagement standby state is detected, the release is carried out without releasing the electronically controlled coupling 16 in advance.

Figure 9:
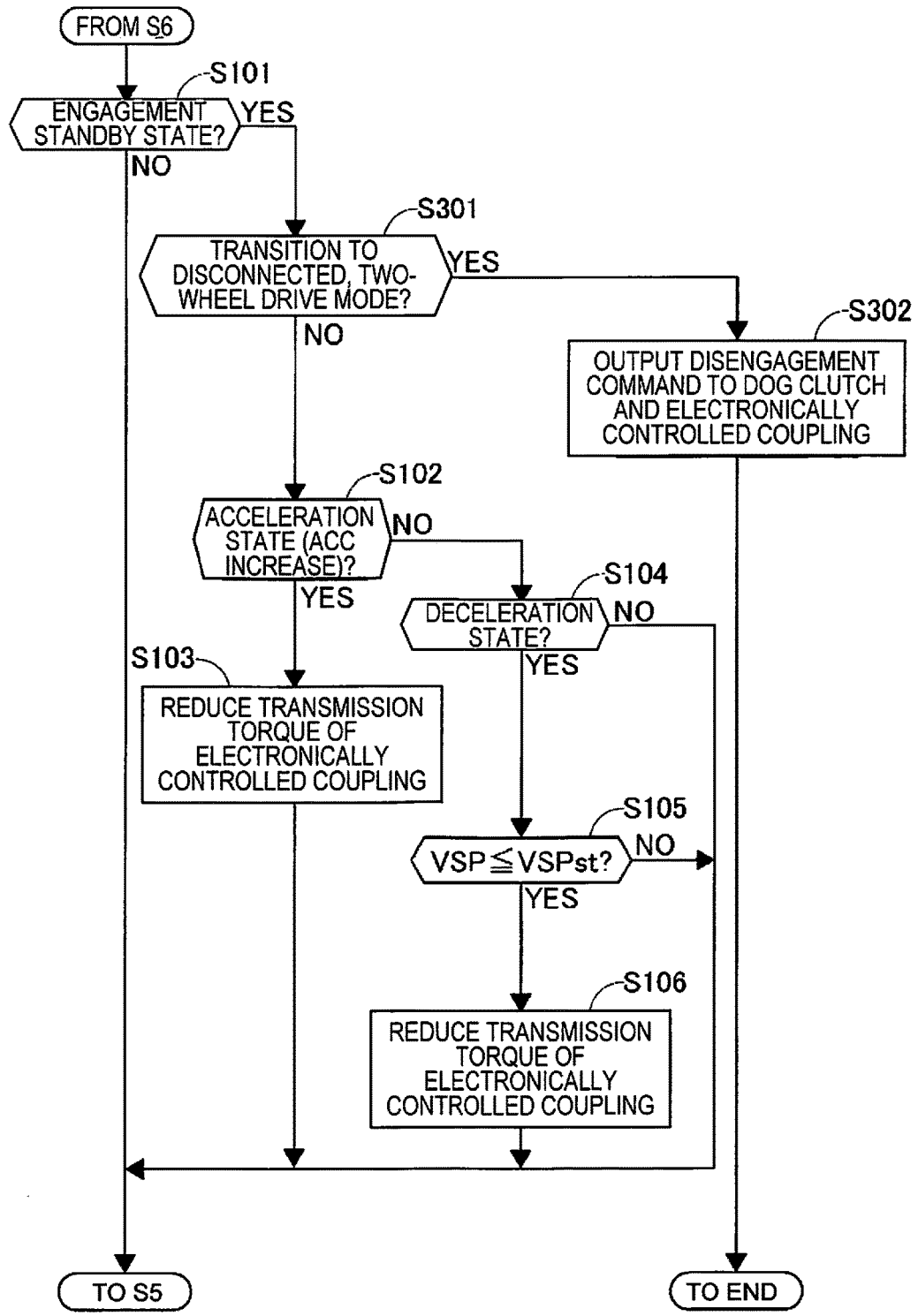
FIG. 9 is a flowchart illustrating the flow of a set of dog clutch engagement promotion process that are executed in Step S10 of FIG. 5 by the clutch control device for a four-wheel drive vehicle of the third embodiment.

As illustrated in the flowchart of FIG. 9, in S301 to which the process proceeds when an engagement standby state is determined in Step S101, it is determined whether or not to transition to the disconnected two-wheel drive mode in which the dog clutch 8 is released by a transition of the vehicle state. If shifting to the disconnected two-wheel drive mode, the process proceeds to Step S302, and if not shifting to the disconnected two-wheel drive mode, the process proceeds to Step S102 and the same process as in the first embodiment is carried out.

In Step S302, to which the process proceeds when transitioning to the disconnected two-wheel drive mode, the dog clutch 8 and the electronically controlled coupling 16 are released at the same time, after which one set of steps is ended. That is, normally, when releasing the dog clutch 8, the dog clutch is released after first releasing the electronically controlled coupling 16 and placement in a state in which the load of the left and right rear wheels 19 and 20 are not applied to the dog clutch 8, but release is carried out immediately when in an engagement standby state.

Therefore, in an engagement standby state, if re-acceleration is carried out by depressing an accelerator pedal (not shown) and the vehicle state transitions to a control region for the disconnected two-wheel drive mode, the dog clutch 8 and the electronically controlled coupling 16 are released at the same time.

In other words, usually, when shifting from the connected four-wheel drive mode to the disconnected two-wheel drive mode, the dog clutch 8 is released after the electronically controlled coupling 16 is released in advance to reduce the load on the dog clutch 8. In contrast, in an engagement standby state, since a load is not applied to the dog clutch 8, the dog clutch 8 can be reliably released without releasing the electronically controlled coupling 16 in advance. Therefore, compared to when a release command is output to the dog clutch 8 after a release operation is actually carried out after a release command is output to the electronically controlled coupling 16, it is possible to increase the responsiveness of the control. In addition, compared to a case in which control is always carried out until the completion of the engagement of the dog clutch 8 when an engagement standby state is detected, it is possible to suppress the frequency of engagement of the dog clutch 8 to achieve improved durability and a reduction in engagement shock.

Fourth Embodiment

The clutch control device of the fourth embodiment is an example in which the clutch control device is applied to a rear wheel drive based four-wheel drive vehicle, and the positional relationship of the dog clutch and the friction clutch which sandwich the differential is the opposite of the positional relationship thereof in the first embodiment.

Figure 10:
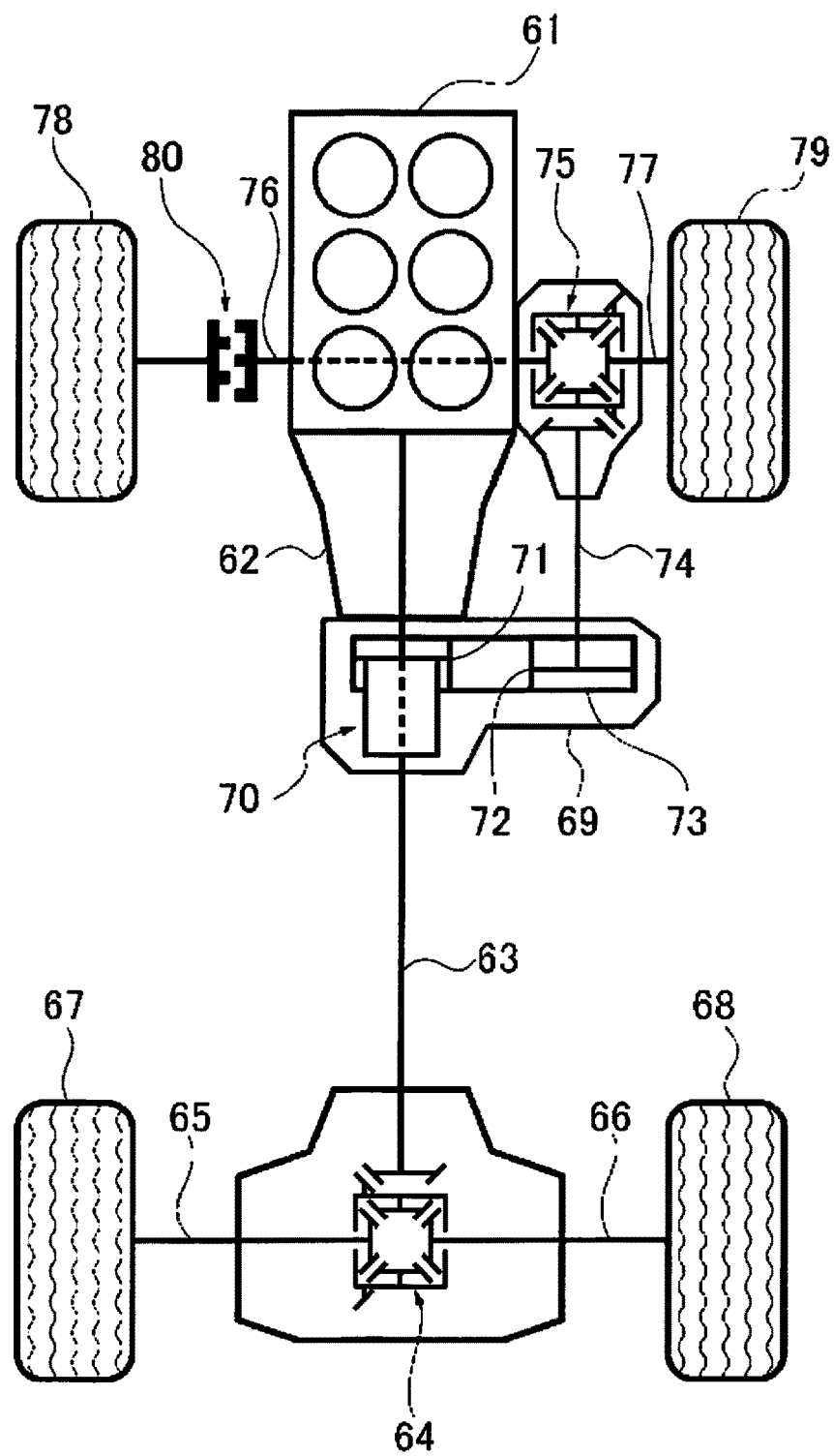
FIG. 10 is a block view of the drive system illustrating the configuration of the drive system of a rear wheel drive based four-wheel drive vehicle to which is applied the clutch control device of the fourth embodiment.

FIG. 10 illustrates the configuration of the drive system of a rear wheel drive based four-wheel drive vehicle to which is applied the clutch control device. The drive system configuration of the four-wheel drive vehicle will be described below based on FIG. 10.

The rear wheel drive system of the four-wheel drive vehicle is provided with a transverse engine 61 (drive source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel). That is, the drive force that has passed through the transverse engine 61 and the transmission 62 is transmitted to the left and right rear wheel drive shafts 65, 66 via the rear propeller shaft 63 and the rear differential 64, and constantly drives the left and right rear wheels 67 and 68 while allowing a differential rotation.

In the front wheel drive system of the four-wheel drive vehicle, a transfer mechanism is configured to comprise, inside a transfer case 69, an electronically controlled coupling 70 (friction clutch), an input side sprocket 71, an output side sprocket 72, and a chain 73. A front propeller shaft 74 that is connected to the output side sprocket 72, a front differential 75, a left front wheel drive shaft 76, a right front wheel drive shaft 77, a left front wheel 78 (auxiliary drive wheel), and a right front wheel 79 (auxiliary drive wheel) are provided. The electronically controlled coupling 70 is disposed inside the transfer case 69 in a position upstream of the input side sprocket 71 (main drive system side position).

A dog clutch 80 (dog clutch) is disposed in an intermediate position of the left front wheel drive shaft 76, which connects the front differential 75 and the left front wheel 78. That is, the drive system is configured to be capable of selecting a two-wheel drive mode (i.e., disconnected two-wheel drive mode) in which both the electronically controlled coupling 70 and the dog clutch 80 are released. The rotation of the drive system (rotation of the front propeller shaft 74, etc.) on the downstream side of the electronically controlled coupling 70 is stopped by releasing this electronically controlled coupling 70 and this dog clutch 80; it is thereby possible to suppress friction loss and oil stirring loss so that improved fuel efficiency can be realized.

Next, the difference between the first embodiment and the second embodiment will be described regarding the synchronous operation of the dog clutch 80. The first embodiment is configured so that the dog clutch 8 is disposed on the drive branch-side transmission system path and the electronically controlled coupling 16 is disposed on the auxiliary drive wheel-side transmission system path, which sandwich the rear differential 15, of the system for transmitting drive force to the left and right rear wheels 19 and 20, which are the auxiliary drive wheels. Accordingly, when there is a request to engage the dog clutch 8, which is in a disengaged state, and an engagement control of the electronically controlled coupling 16 is carried out, the left side gear of the rear differential 15 is restricted by the rotational frequency of the left rear wheel 19.

Therefore, of the three rotating members of the rear differential 15 (the left and right side gears and the differential case), the rotational frequencies of the left and right side gears are restricted; the rotational frequency of the propeller shaft 12, which is connected to the differential case, thereby takes on the average rotational frequency of the left and right rear wheels 19 and 20 (driven wheel rotational frequency). As a result, when the left and right front wheels 6 and 7 are in a non-slip state, the differential rotation ΔN of the dog clutch 8 becomes ΔN=0. (refer to FIG. 7). However, when the left and right front wheels 6 and 7 are in a slip state, the differential rotation ΔN of the dog clutch 8 which has been decreasing with time will reach a limit at a certain differential rotation; thereafter, the clutch differential rotation ΔN of the dog clutch 8 shifts to an increase, and the differential rotation speed ΔN of the dog clutch 8 is increased with time (refer to FIG. 8).

In contrast, the fourth embodiment is configured so that the electronically controlled coupling 70 is disposed in the drive branch-side transmission system path and the dog clutch 80 is disposed in the auxiliary drive wheel-side transmission system path, which sandwich the front differential 75, of the system for transmitting drive force to the left and right front wheels 78, 79, which are the auxiliary drive wheels. Accordingly, when there is a request to engage the dog clutch 80, which is in a disengaged state, and an engagement control of the electronically controlled coupling 70 is carried out, the differential case of the front differential 75 is restricted by the rotational frequency of the rear propeller shaft 63.

Therefore, of the three rotating members of the front differential 75 (left and right side gears and the differential case), the rotational frequencies of the right side gear (right front wheel 79) and the differential case are restricted; the rotational frequency of the left side gear will thereby be determined by two rotational frequencies. As a result, when the left and right rear wheels 67 and 68 are in a non-slip state, the differential rotation ΔN of the dog clutch 80 becomes ΔN=0. However, when the left and right rear wheels 67 and 68 are in a slip state, the differential rotation ΔN of the dog clutch 80 which has been decreasing with time will be reversed across ΔN=0 (zero); thereafter, the differential rotation ΔN of the dog clutch 80 will be increased in a reversed state. The other actions are the same as the first embodiment; thus, the descriptions thereof are omitted.

Next, the effects are described. The following effects can be obtained with the clutch control device for a four-wheel drive vehicle as recited in the fourth embodiment.

4-1) In the clutch control device for a four-wheel drive vehicle of the fourth embodiment,
the electronically controlled coupling 70 as the friction clutch is disposed in a position upstream of a transfer mechanism (input side sprocket 71, output side sprocket 72, chain 73) provided at a drive branch position to the left and right front wheels 78, 79 as the auxiliary drive wheels, and the dog clutch 80 as the dog clutch is disposed in the position of the left front wheel drive shaft 76, which extends from the transfer mechanism to the left front wheel 78 as an auxiliary drive wheel, via the propeller shaft and the front differential 75. Accordingly, in addition to the effects of 1) to 9) described above, in a rear wheel drive based four-wheel drive vehicle, when the disconnected two-wheel drive mode is selected, it is possible effectively to suppress friction loss and oil stirring loss, to achieve an improvement in fuel efficiency.

The clutch control device for a four-wheel drive vehicle of the present invention was described above on the basis of the embodiments, but specific configurations thereof are not limited to these embodiments, and various modifications and additions to the design can be made without departing from the scope of the invention according to each claim in the Claims section.

In the first to the third embodiments, examples were shown in which the invention is applied to a front wheel drive based four-wheel drive vehicle (4WD engine vehicle), in which an engine is mounted as the drive source. In the fourth embodiment, an example was shown in which the clutch control device of the present invention is applied to a rear wheel drive based four-wheel drive vehicle (4WD engine vehicle), in which the left and right rear wheels are the main drive wheels. However, the clutch control device may be applied to a rear wheel drive based four-wheel drive vehicle in which the positional relationship of the dog clutch and the friction clutch has the same relationship as in the first embodiment. In addition, the clutch control device may be applied to a front wheel drive based four-wheel drive vehicle in which the positional relationship of the dog clutch and the friction clutch has the same relationship as in the second embodiment. Additionally, the clutch control device of the present invention can be applied to other vehicles besides a 4WD engine vehicle, such as a 4WD hybrid vehicle in which an engine and a motor are mounted as drive sources, or a 4WD electric vehicle in which a motor is mounted as the drive source.

Figure 11:
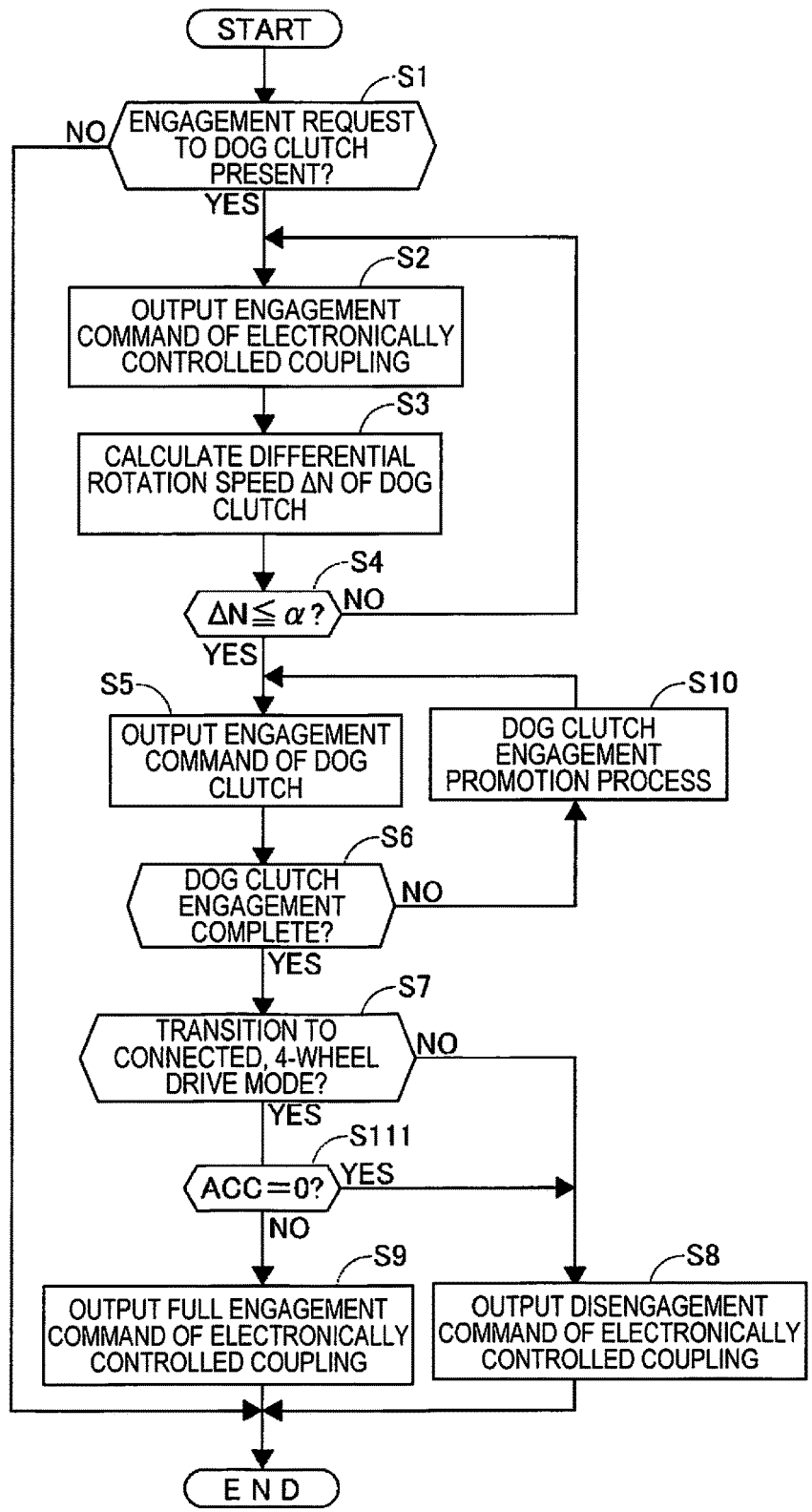
FIG. 11 is a flowchart illustrating another example of the flow of a set of clutch control process during "auto mode" that are executed by the 4WD control unit of the clutch control device for a four-wheel drive vehicle of the embodiment.
Figure 12:
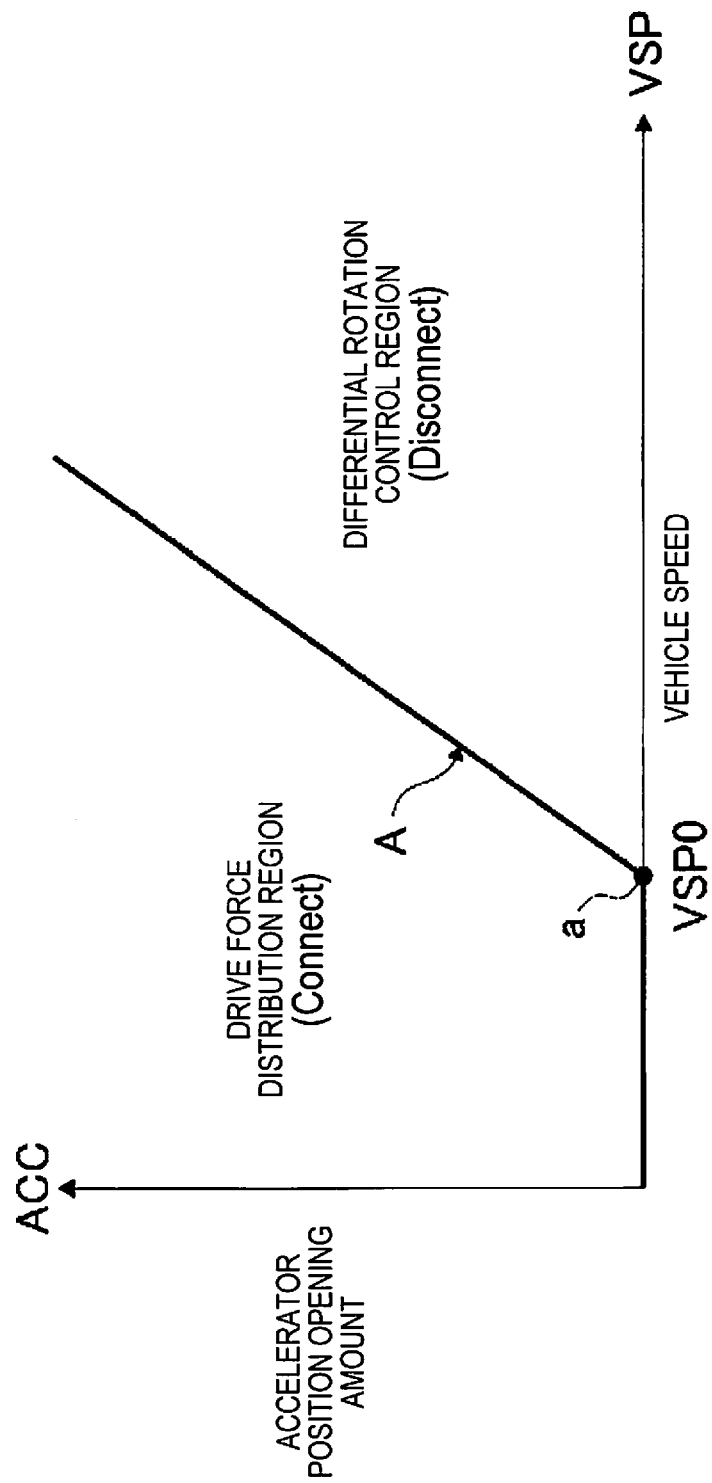
FIG. 12 is a basic map view illustrating another example of a drive mode switching map corresponding to the vehicle speed and the accelerator position opening amount used in the clutch control, when "auto mode" is selected.

In addition, in the embodiments, when controlling the mode to the connected four-wheel drive mode, the dog clutch (dog clutch) and the electronically controlled coupling (friction clutch) are engaged regardless of the accelerator position opening amount; however, it may be configured so that the standby two-wheel drive mode is set when stopping after engaging the dog clutch, and so that the connected four-wheel drive mode is set if a differential rotation occurs in the front and rear wheels at the time of starting. That is, as illustrated in the flowchart of FIG. 11, when a transition to the connected four-wheel drive mode in Step S7 is determined, it is determined whether or not the accelerator position opening amount ACC is zero in Step S111 before proceeding to Step S9. If ACC=0, the process proceeds to Step S8 and the electronically controlled coupling 16 is released. On the other hand, if ACC does not equal zero, the process proceeds to Step S9 in preparation for the next acceleration, and the electronically controlled coupling 16 is engaged for placement in the connected four-wheel drive mode. In this manner, if re-acceleration is not carried out (ACC=0) when the vehicle is stopped, it is possible to suppress fluctuation in the load caused by switching to the four-wheel drive mode immediately before stopping by releasing the electronically controlled coupling 16. In addition, in the embodiments, the two-wheel drive mode is separated into the disconnected two-wheel drive mode and the standby two-wheel drive mode; however, the two-wheel drive mode may be only the disconnected two-wheel drive mode, as illustrated in FIG. 12, in order to further secure fuel efficiency.

The invention claimed is:

1. A clutch control device for a four-wheel drive vehicle having a pair of main drive wheels, a pair of auxiliary drive wheels, and a drive source configured to output a drive force, the clutch control device comprising:
a dog clutch operatively disposed in a transmission path between the main drive wheels and the auxiliary drive wheels to separate a system for transmitting the drive force to the auxiliary drive wheels from a system for transmitting the drive force to the main drive wheels by releasing the dog clutch;
a friction clutch operatively disposed in the transmission path between the main drive wheels and the auxiliary drive wheels to allocate a portion of the drive force from the drive source to the auxiliary drive wheels in accordance with a clutch engagement capacity of the friction clutch;

an engagement standby state sensor configured to detect an engagement standby state in which engagement of the dog clutch is incomplete at a time of an engagement operation of the dog clutch; and a clutch control unit operatively coupled to the dog clutch and the friction clutch to selectively carry out an engagement and disengagement control of the dog clutch and an engagement and disengagement control of the friction clutch in accordance with a vehicle state that is detected by the engagement standby state sensor such that the four-wheel drive vehicle is switched between a two-wheel drive state in which only the main drive wheels are driven and a four-wheel drive state in which the main drive wheels and the auxiliary drive wheels are driven, the clutch control unit being further programmed such that when the dog clutch will be engaged, the clutch control unit carries out a control to engage the friction clutch and synchronize the dog clutch before engaging the dog clutch, and the clutch control unit being further programmed to reduce a transmission torque of the friction clutch when the engagement standby state is detected during the engagement of the dog clutch, the clutch control unit further executing a waiting step before reducing the transmission torque of the friction clutch if the four-wheel drive vehicle is decelerating when the engagement standby state is detected during the engagement of the dog clutch.

2. The clutch control device as recited in claim 1, wherein the clutch control unit is further programmed to execute a control to switch from a disconnected two-wheel drive mode in which the dog clutch and the friction clutch are released to a drive mode in which the dog clutch is engaged, when the vehicle is accelerating.

3. The clutch control device according to claim 2, wherein the clutch control unit is further programmed to reduce the transmission torque to a degree that a differential rotation is generated between a drive source side and an auxiliary drive source side of the dog clutch when reducing the transmission torque of the friction clutch.

4. The clutch control device according to claim 2, wherein the clutch control unit is further programmed to carry out the reduction gradually over time when reducing the transmission torque of the friction clutch.

5. The clutch control device according to claim 2, wherein the clutch control unit is further programmed to wait for a vehicle speed to go below a vehicle speed threshold value that is set in advance in the waiting step.

6. The clutch control device according to claim 5, wherein the clutch control unit is further programmed to carry out a drive mode switch control in accordance with the vehicle speed, wherein the drive mode is controlled to the disconnected two-wheel drive mode when the vehicle speed is in a higher vehicle speed region than a mode switch vehicle speed that is set in advance, and the drive mode is switched to a four-wheel drive mode in a lower vehicle speed region than the mode switch vehicle speed, and the clutch control unit is further programmed to set the vehicle speed threshold value to a value that is below the mode switch vehicle speed.

7. The clutch control device according to claim 6, wherein the clutch control unit is further programmed to set the vehicle speed threshold value to a value at which an engagement shock is generated when engaging the dog clutch is suppressed.

8. The clutch control device according to claim 5, wherein the clutch control unit is further programmed to carry out the reduction with a gradient that decreases with time when reducing the transmission torque of the friction clutch in the engagement standby state during deceleration.

9. The clutch control device according to claim 2, wherein the dog clutch is disposed upstream of a transfer mechanism provided at a drive branch position to the auxiliary drive wheels, and the friction clutch is disposed in a drive shaft of one of the auxiliary drive wheels which extends from the transfer mechanism that is connected to a propeller shaft and a differential.

10. The clutch control device according to claim 2, wherein the friction clutch is disposed upstream of a transfer mechanism provided at a drive branch position to the auxiliary drive wheels, and the dog clutch is disposed in a drive shaft of one of the auxiliary drive wheels which extends from the transfer mechanism that is connected to a propeller shaft and a differential.

11. The clutch control device as recited in claim 1, wherein the clutch control unit is further programmed to reduce the transmission torque to a degree that a differential rotation is generated between a drive source side and an auxiliary drive source side of the dog clutch when reducing the transmission torque of the friction clutch.

12. The clutch control device as recited in claim 1, wherein the clutch control unit is further programmed to carry out the reduction gradually over time when reducing the transmission torque of the friction clutch.

13. The clutch control device as recited in claim 1, wherein the dog clutch is disposed upstream of a transfer mechanism provided at a drive branch position to the auxiliary drive wheels, and the friction clutch is disposed in a drive shaft of one of the auxiliary drive wheels which extends from the transfer mechanism that is connected to a propeller shaft and a differential.

14. The clutch control device as recited in claim 1, wherein the friction clutch is disposed upstream of a transfer mechanism provided at a drive branch position to the auxiliary drive wheels, and the dog clutch is disposed in a drive shaft of one of the auxiliary drive wheels which extends from the transfer mechanism that is connected to a propeller shaft and a differential.

15. A clutch control device for a four-wheel drive vehicle having a pair of main drive wheels, a pair of auxiliary drive wheels, and a drive source configured to output a drive force, the clutch control device comprising:

a dog clutch operatively disposed in a transmission path between the main drive wheels and the auxiliary drive wheels to separate a system for transmitting the drive force to the auxiliary drive wheels from a system for transmitting the drive force to the main drive wheels by releasing the dog clutch;

a friction clutch operatively disposed in the transmission path between the main drive wheels and the auxiliary drive wheels to allocate a portion of the drive force from the drive source to the auxiliary drive wheels in accordance with a clutch engagement capacity of the friction clutch;

an engagement standby state sensor configured to detect an engagement standby state in which engagement of the dog clutch is incomplete at a time of an engagement operation of the dog clutch; and a clutch control unit operatively coupled to the dog clutch and the friction clutch to selectively carry out an engagement and disengagement control of the dog clutch and an engagement and disengagement control of the friction clutch in accordance with a vehicle state that is detected by the engagement standby state sensor such that the four-wheel drive vehicle is switched between a two-wheel drive state in which only the main drive wheels are driven and a four-wheel drive state in which the main drive wheels and the auxiliary drive wheels are driven, the clutch control unit being further programmed such that when the dog clutch will be engaged, the clutch control unit carries out a control to engage the friction clutch and synchronize the dog clutch before engaging the dog clutch, the clutch control unit being further programmed to reduce a transmission torque of the friction clutch when the engagement standby state is detected during the engagement of the dog clutch, the clutch control unit being further programmed to execute a control to switch from a disconnected two-wheel drive mode in which the dog clutch and the friction clutch are released to a drive mode in which the dog clutch is engaged, when the vehicle is accelerating, the clutch control unit including as drive modes in which the dog clutch is engaged, a connected four-wheel drive mode in which the dog clutch and the friction clutch clutches are engaged, and a standby two-wheel drive mode in which the dog clutch is engaged and the friction clutch is released, and the clutch control unit being further programmed to release the friction clutch after engaging the dog clutch, when establishing the standby two-wheel drive mode.

16. The clutch control device as recited in claim 13, wherein the clutch control unit is further programmed to carry out a switching control of the drive modes based on a drive mode switching map according to an accelerator position opening amount and a vehicle speed, in which are set a control region for the disconnected two-wheel drive mode set in a low accelerator position opening amount/high vehicle speed region, a control region for the standby two-wheel drive mode set in a higher accelerator position opening amount region than the control region for the disconnected two-wheel drive mode, and a control region for the connected four-wheel drive mode set in a higher accelerator position opening amount/lower vehicle speed region than the control region for the disconnected two-wheel drive mode.

17. A clutch control device for a four-wheel drive vehicle having a pair of main drive wheels, a pair of auxiliary drive wheels, and a drive source configured to output a drive force, the clutch control device comprising:

a dog clutch operatively disposed in a transmission path between the main drive wheels and the auxiliary drive wheels to separate a system for transmitting the drive force to the auxiliary drive wheels from a system for transmitting the drive force to the main drive wheels by releasing the dog clutch;

a friction clutch operatively disposed in the transmission path between the main drive wheels and the auxiliary drive wheels to allocate a portion of the drive force from the drive source to the auxiliary drive wheels in accordance with a clutch engagement capacity of the friction clutch;

an engagement standby state sensor configured to detect an engagement standby state in which engagement of the dog clutch is incomplete at a time of an engagement operation of the dog clutch; and a clutch control unit operatively coupled to the dog clutch and the friction clutch to selectively carry out an engagement and disengagement control of the dog clutch and an engagement and disengagement control of the friction clutch in accordance with a vehicle state that is detected by the engagement standby state sensor such that the four-wheel drive vehicle is switched between a two-wheel drive state in which only the main drive wheels are driven and a four-wheel drive state in which the main drive wheels and the auxiliary drive wheels are driven, the clutch control unit being further programmed such that when the dog clutch will be engaged, the clutch control unit carries out a control to engage the friction clutch and synchronize the dog clutch before engaging the dog clutch, the clutch control unit being further programmed to reduce a transmission torque of the friction clutch when the engagement standby state is detected during the engagement of the dog clutch, the clutch control unit being further programmed to reduce the transmission torque of the friction clutch after waiting for a vehicle speed to go below a vehicle speed threshold value that is set in advance.

18. The clutch control device as recited in claim 17, wherein the clutch control unit is further programmed to carry out a drive mode switch control in accordance with the vehicle speed, wherein a drive mode is controlled to a disconnected two-wheel drive mode in which the dog clutch and the friction clutch are released when the vehicle speed is in a higher vehicle speed region than a mode switch vehicle speed that is set in advance, and the drive mode is switched to a four-wheel drive mode in a lower vehicle speed region than the mode switch vehicle speed, and the clutch control unit is further programmed to set the vehicle speed threshold value to a value that is below the mode switch vehicle speed.

19. The clutch control device as recited in claim 18, wherein the clutch control unit is further programmed to set the vehicle speed threshold value to a value at which an engagement shock generated when engaging the dog clutch is suppressed.

20. The clutch control device as recited in claim 17, wherein the clutch control unit is further programmed to carry out the reduction with a gradient that decreases with time when reducing the transmission torque of the friction clutch in the engagement standby state during deceleration.

* * * * *